(12) United States Patent
Suga et al.

(10) Patent No.: US 11,910,511 B2
(45) Date of Patent: Feb. 20, 2024

(54) INDUCTION HEATING COOKING APPARATUS

(71) Applicant: Mitsubishi Electric Corporation, Tokyo (JP)

(72) Inventors: Ikuro Suga, Tokyo (JP); Hayato Yoshino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 552 days.

(21) Appl. No.: 17/050,926

(22) PCT Filed: Jun. 14, 2018

(86) PCT No.: PCT/JP2018/022794
§ 371 (c)(1),
(2) Date: Oct. 27, 2020

(87) PCT Pub. No.: WO2019/239557
PCT Pub. Date: Dec. 19, 2019

(65) Prior Publication Data
US 2021/0243853 A1    Aug. 5, 2021

(51) Int. Cl.
*H05B 6/12* (2006.01)
*H05B 6/06* (2006.01)

(52) U.S. Cl.
CPC ........... *H05B 6/1245* (2013.01); *H05B 6/062* (2013.01); *H05B 2206/022* (2013.01)

(58) Field of Classification Search
CPC .... H05B 6/1272; H05B 6/1245; H05B 6/062; H05B 2206/022; Y02B 40/00
See application file for complete search history.

(56) References Cited

U.S. PATENT DOCUMENTS

| 2015/0114953 A1 | 4/2015 | Suzuki et al. |
| 2016/0113070 A1* | 4/2016 | Suzuki .................. H05B 6/1272 |
| | | 219/622 |
| 2016/0135255 A1 | 5/2016 | Ogawa et al. |

FOREIGN PATENT DOCUMENTS

| EP | 3 133 899 A1 | 2/2017 |
| JP | 2007-157614 A | 6/2007 |

(Continued)

OTHER PUBLICATIONS

International Search Report of the International Searching Authority dated Sep. 18, 2018 for the corresponding International application No. PCT/JP2018/022794 (and English translation).

(Continued)

*Primary Examiner* — Dana Ross
*Assistant Examiner* — Kuangyue Chen
(74) *Attorney, Agent, or Firm* — POSZ LAW GROUP, PLC

(57) ABSTRACT

An induction heating cooking apparatus according to an embodiment of the present disclosure includes: a plurality of heating coils each including an inner circumferential coil provided on an innermost circumferential side and an outer circumferential coil provided on an outermost circumferential side; and a supporting base that is provided below the plurality of heating coils, and support the plurality of heating coils. The supporting base is formed in the shape of a flat plate and made of a nonmagnetic body, and has a plurality of openings under the outer circumferential coil.

15 Claims, 15 Drawing Sheets

(56)  References Cited

FOREIGN PATENT DOCUMENTS

| | | | | |
|---|---|---|---|---|
| JP | 2008-117638 A | | 5/2008 | |
| JP | 2008117638 A | * | 5/2008 | |
| JP | 2010109101 A | * | 5/2010 | ............... G11C 7/02 |
| JP | 2011-108432 A | | 6/2011 | |
| JP | 2011-222535 A | | 11/2011 | |
| JP | 2011-258339 A | | 12/2011 | |
| JP | 2012-104418 A | | 5/2012 | |
| JP | 2012-109101 A | | 6/2012 | |
| JP | 2013-080604 A | | 5/2013 | |
| JP | 2013-218942 A | | 10/2013 | |
| JP | 2016-157651 A | | 9/2016 | |
| JP | 2017083020 A | * | 5/2017 | |
| JP | 2017-183020 A | | 10/2017 | |
| JP | 2017-188475 A | | 10/2017 | |
| WO | 2014/156010 A1 | | 10/2014 | |
| WO | 2015/029441 A1 | | 3/2015 | |
| WO | 2015/159451 A1 | | 10/2015 | |
| WO | WO-2015159451 A1 | * | 10/2015 | ............. H05B 6/065 |

OTHER PUBLICATIONS

Office Action dated May 11, 2022 issued in corresponding CN Patent Application No. 201880093309.6 (and English translation).
Office Action dated Aug. 10, 2021 issued in corresponding JP patent application No. 2020-525038 (and English translation).
Decision of Rejection dated Feb. 9, 2023 issued in corresponding CN Patent Application No. 201880093309.6. (and English machine translation).

* cited by examiner

INDUCTION HEATING COOKING APPARATUS

CROSS REFERENCE TO RELATED APPLICATION

This application is a U.S. national stage application of International Application No. PCT/JP2018/022794 filed on Jun. 14, 2018, the contents of which are incorporated herein by reference.

TECHNICAL FIELD

The present disclosure relates to an induction heating cooking apparatus including a plurality of heating coils.

BACKGROUND ART

Existing induction heating cooking apparatuses include a heating coil unit. The heating coil unit includes a heating coil, an insulating plate provided on a lower surface side of the heating coil, a ferrite provided under the insulating plate, and a shield plate which is attached to a framework and on which the ferrite is mounted. The shield plate is made of nonmagnetic metal such as aluminum. The shield plate serves as a heating coil supporting member (see, for example, Patent Literature 1).

CITATION LIST

Patent Literature

Patent Literature 1: International Publication No. 2014/156010

SUMMARY OF INVENTION

Technical Problem

Objects to be heated by an induction heating cooking apparatus includes an object made of a composite material in which a magnetic body is attached to a nonmagnetic body. As such an object to be heated, a frying pan to which metal is attached is present. To be more specific, the flying pan is made of nonmagnetic aluminum, and magnetic metal such as stainless steel is attached to the center of the bottom of the frying pan. Furthermore, in general, in an object to be heated that is made of a composite body, a magnetic body is attached to a flat center portion of the bottom surface of a nonmagnetic body, but is not attached to a curved outer circumferential portion of the bottom surface. In the case of inductively heating the object made of a composite body with a plurality of heating coils, the frequency of a high-frequency current to be supplied to an outer circumferential coil of a plurality of heating coils that is provided on an outer circumferential side is increased higher than the frequency of a high-frequency current to be supplied to an inner circumferential coil of the plurality of heating coils that is provided on an inner circumferential side. Since this heating operation is performed in the above manner, it is possible to perform induction heating suitable for the material of the object.

However, in the induction heating cooking apparatus disclosed in Patent Literature 1, a supporting base (shield plate) made of nonmagnetic metal is provided under the heating coils. Therefore, when the induction heating cooking apparatus disclosed in Patent Literature 1 performs a heating operation suitable for an object to be heated that is made of a composite material as described above, an eddy current is generated in the supporting base. As a result, the temperature of the supporting base rises.

The present disclosure is applied to solve the above problem, and relates to an induction heating cooking apparatus capable of reducing a temperature rise of a supporting base made of a nonmagnetic body.

Solution to Problem

An induction heating cooking apparatus according to an embodiment of the present disclosure includes: a plurality of heating coils including an inner circumferential coil provided on an innermost circumferential side and an outer circumferential coil provided on an outermost circumferential side; a supporting base that is provided below the plurality of heating coils, and supports the plurality of heating coils; a plurality of inverter circuits each of which supplies high-frequency power to an associated one of the plurality of heating coils; and a controller that controls driving of the plurality of inverter circuits, and performs a heating operation in which a frequency of high-frequency power to be supplied to the outer circumferential coil is increased higher than a frequency of high-frequency power to be supplied to the inner circumferential coil. The supporting base is formed in the shape of a flat plate and made of a nonmagnetic body, and includes a plurality of openings formed in part of the supporting base that is located below the outer circumferential coil.

Advantageous Effects of Invention

According to the present disclosure, the supporting base is made of a flat plate that is made of nonmagnetic body, and the plurality of openings are formed below the outer circumferential coil. Therefore, it is possible to reduce a temperature rise of the supporting base.

DESCRIPTION OF EMBODIMENTS

Embodiment 1

Figure 1:
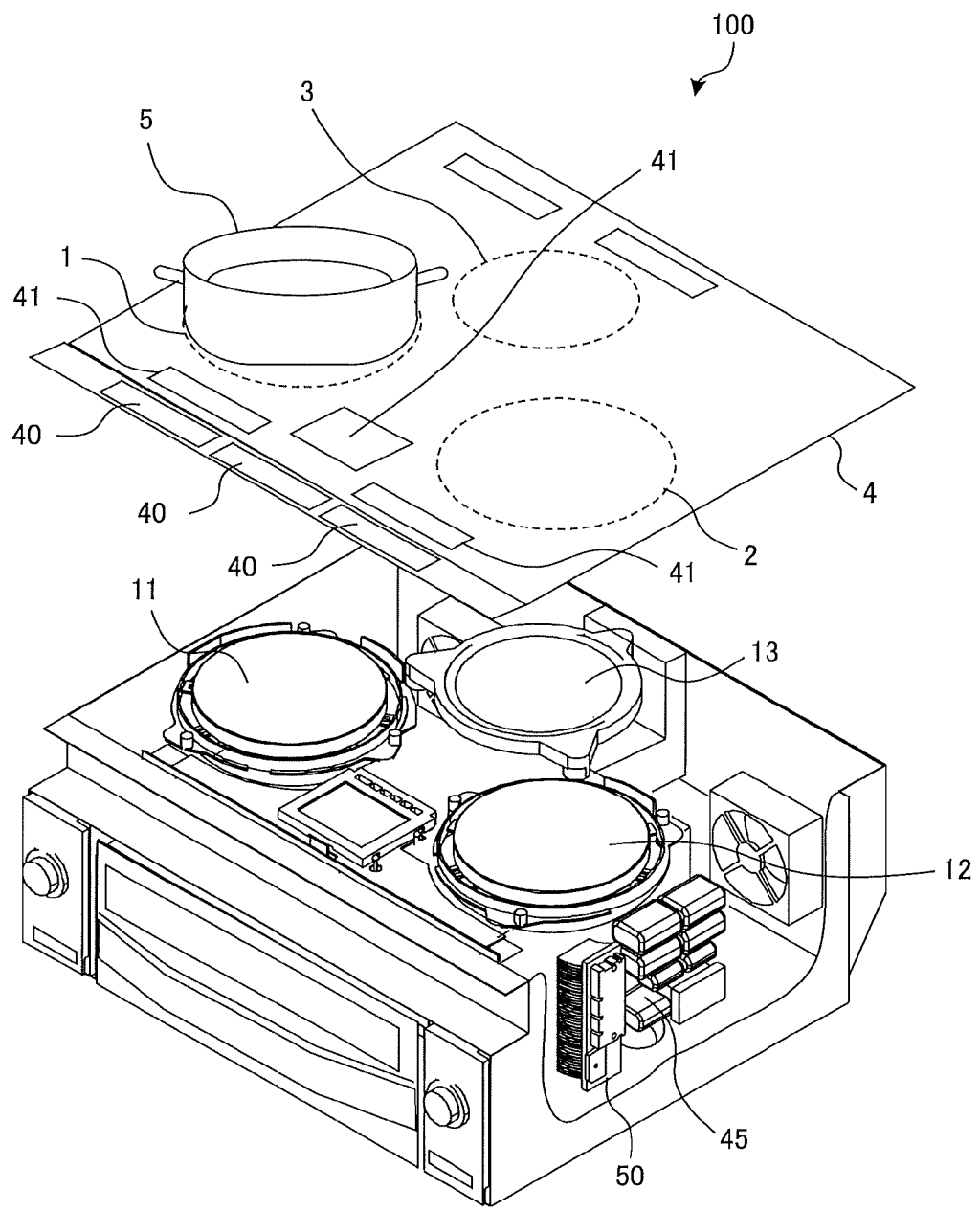
FIG. 1 is an exploded perspective view illustrating an induction heating cooking apparatus according to Embodiment 1.

FIG. 1 is an exploded perspective view illustrating an induction heating cooking apparatus according to Embodiment 1.

As illustrated in FIG. 1, an induction heating cooking apparatus 100 includes, at its upper part, a top plate 4 on which an object 5 to be heated, such as a pot, is placed. The top plate 4 includes a first induction heating zone 1 and a second induction heating zone 2 as heating zones for inductively heating the object 5. The first induction heating zone 1 and the second induction heating zone 2 are arranged side by side in a lateral direction of the top plate 4 on a front side of the top plate 4. The induction heating cooking apparatus 100 according to Embodiment 1 further includes a third induction heating zone 3 as a third heating zone. The third induction heating zone 3 is provided behind the first induction heating zone 1 and the second induction heating zone 2, and substantially at a central area of the top plate 4 in the lateral direction.

A first induction heating unit 11, a second induction heating unit 12, and a third induction heating unit 13 are provided under the first induction heating zone 1, the second induction heating zone 2, and the third induction heating zone 3, respectively, and are each configured to heat the object 5 placed on an associated one of the heating zones. Each heating unit includes coils (see FIG. 2).

The entire top plate 4 is made of an infrared-transparent material such as heat-resistant reinforced glass or crystallized glass. Circular pot-position marks are formed on the top plate 4 by applying or printing paint on the top plate 4, for example. The pot position marks roughly indicate pot placement positions that correspond to respective heating areas of the first induction heating unit 11, the second induction heating unit 12, and the third induction heating unit 13.

Operation portions 40 are provided on the front side of the top plate 4. Each of the operation portions 40 serves as an input device that sets the supply of power and a cooking mode when the object 5 is heated using an associated one of the first induction heating unit 11, the second induction heating unit 12, and the third induction heating unit 13. In Embodiment 1, three operation portions 40 are provided for each of the induction heating coils.

Display portions 41 are provided close to the operation portions 40 as indication means. Each of the display portions 41 displays information such as an operational state of an associated one of the induction heating coils, and details of an operation and an input from an associated one of the operation portions 40. In Embodiment 1, three display portions 41 are provided for each of the induction heating coils.

It should be noted that the operation portions 40 may be provided for the respective induction heating units as described above, or an operation portion 40 may be used in common for the induction heating units; and likewise, the display portions 41 may be provided for the respective induction heating units as described above, and a display portion 41 may be used in common for the induction heating units. Each of the operation portions 40 is, for example, a mechanical switch such as a push switch or a tactile switch, or a touch switch that detects an input operation based on a change of the capacitance of an electrode. Each of the display portions 41 is, for example, an LCD or an LED.

Each operation portion 40 and each display portion 41 may be combined into an operation and display portion 43. The operation and display portion 43 is, for example, a touch panel having a touch switch provided on the upper surface of an LCD. It should be noted that LCD is an abbreviation for liquid crystal device, and LED is an abbreviation for light emitting diode.

In the induction heating cooking apparatus 100, drive circuits 50 and a controller 45 are provided. The drive circuits supply high-frequency power to the coils of the first induction heating unit 11, the second induction heating unit 12, and the third induction heating unit 13. The controller 45 controls the operation of the entire induction heating cooking apparatus including the drive circuits 50.

When high-frequency power is supplied to the first induction heating unit 11, the second induction heating unit 12, and the third induction heating unit 13 by the respective drive circuits 50, a high-frequency magnetic field is generated from each of the coils of the induction heating units. The configuration of each drive circuit 50 will be described in detail later.

The first induction heating unit 11, the second induction heating unit 12, and the third induction heating unit 13 are configured as described below, for example. It should be noted that the first induction heating unit 11, the second induction heating unit 12, and the third induction heating unit 13 have the same configuration. Therefore, only the configuration of the first induction heating unit 11 will be described below.

Figure 2:
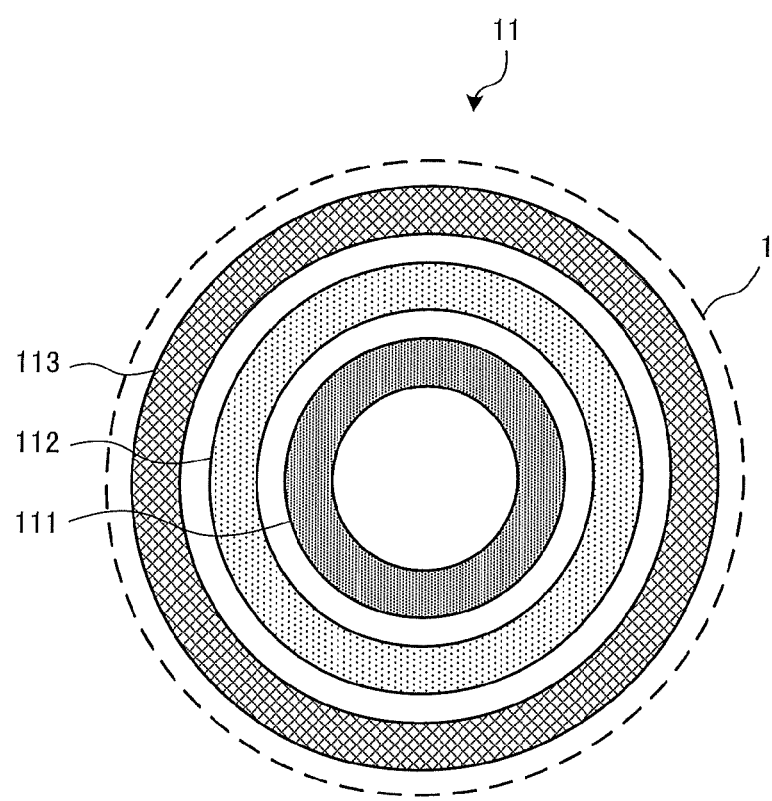
FIG. 2 is a plan view illustrating a first induction heating unit in the induction heating cooking apparatus according to Embodiment 1.

FIG. 2 is a plan view illustrating the first induction heating unit in the induction heating cooking apparatus according to Embodiment 1.

The first induction heating unit 11 includes a plurality of ring-shaped coils arranged concentrically and having different diameters. Referring to FIG. 2, the first induction heating unit 11 includes three ring-shaped coils. To be more specific, the first induction heating unit 11 includes an inner circumferential coil 111 provided at the center of the first induction heating zone 1, an intermediate coil 112 provided on an outer circumferential side of the inner circumferential coil 111, and an outer circumferential coil 113 provided on an outer circumferential side of the intermediate coil 112. That is, the inner circumferential coil 111 is provided on the innermost circumferential side. The outer circumferential coil 113 is provided on the outermost circumferential side. The intermediate coil 112 is provided between the inner circumferential coil 111 and the outer circumferential coil 113.

The inner circumferential coil 111, the intermediate coil 112, and the outer circumferential coil 113 are each formed by winding a conductive wire made of insulation-coated metal. As the wire, an arbitrary metal such as copper or aluminum, can be used. Each of the inner circumferential coil 111, the intermediate coil 112, and the outer circumferential coil 113 is independently formed by winding a conductive wire.

In the following description, the inner circumferential coil 111, the intermediate coil 112, and the outer circumferential coil 113 may also be collectively referred to as a plurality of heating coils.

Figure 3:
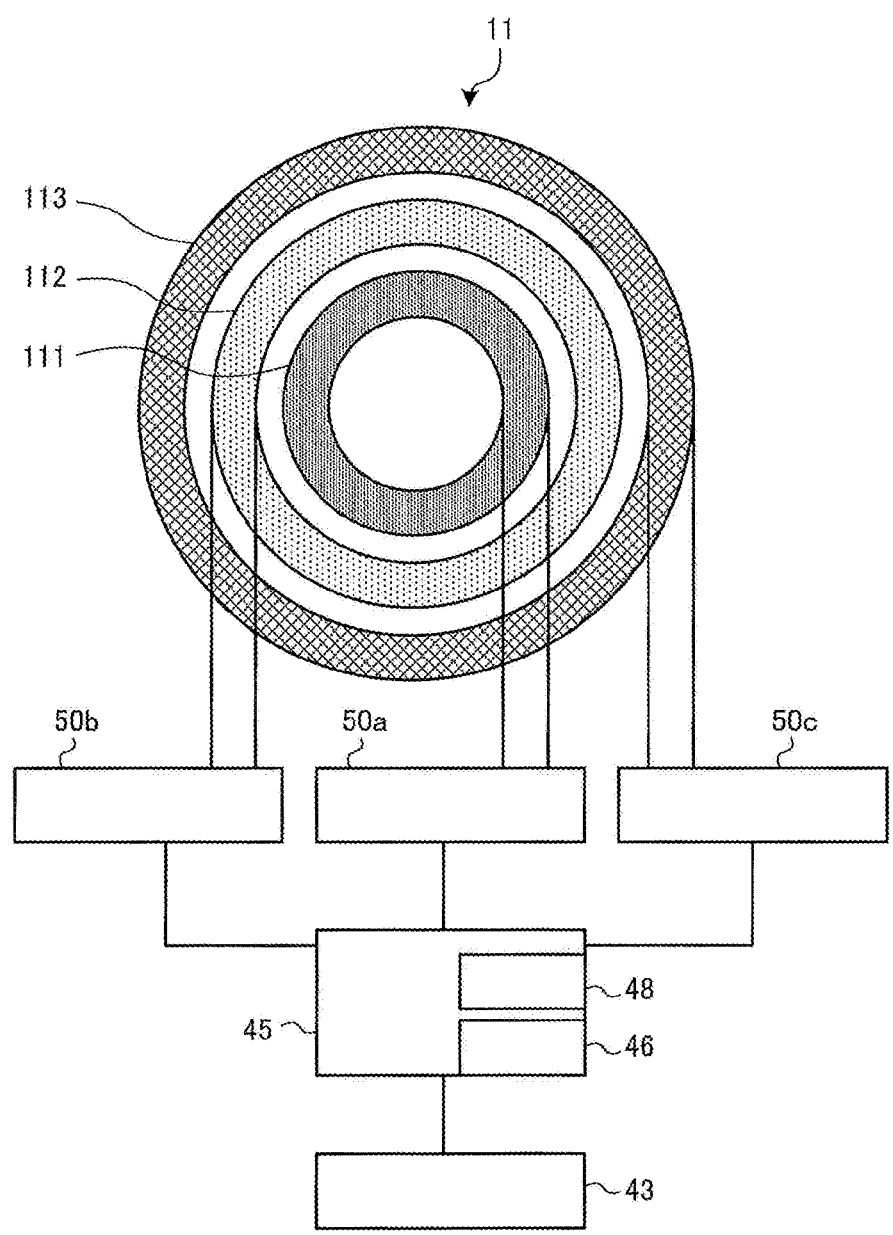
FIG. 3 is a block diagram illustrating a configuration of the induction heating cooking apparatus according to Embodiment 1.

FIG. 3 is a block diagram illustrating a configuration of the induction heating cooking apparatus according to Embodiment 1.

As illustrated in FIG. 3, the first induction heating unit 11 is driven and controlled by drive circuits 50a, 50b, and 50c. Specifically, the inner circumferential coil 111 is driven and controlled by the drive circuit 50a. The intermediate coil 112 is driven and controlled by the drive circuit 50b. The outer circumferential coil 113 is driven and controlled by the drive circuit 50c. When a high-frequency current is supplied from the drive circuit 50a to the inner circumferential coil 111, a high-frequency magnetic field is generated from the inner circumferential coil 111. When a high-frequency current is supplied from the drive circuit 50b to the intermediate coil 112, a high-frequency magnetic field is generated from the intermediate coil 112. When a high-frequency current is supplied from the drive circuit 50c to the outer circumferential coil 113, a high-frequency magnetic field is generated from the outer circumferential coil 113.

The controller 45 is dedicated hardware or a CPU that executes a program stored in a memory 48. The controller 45 further includes a material determining unit 46 that determines a material of parts of an object 5 that are located above the inner circumferential coil 111, the intermediate coil 112, and the outer circumferential coil 113. It should be noted that CPU is an abbreviation for central processing unit. The CPU is also referred to as a central processing unit, a processing unit, an arithmetic unit, a microprocessor, microcomputer, or a processor.

In the case where the controller 45 is dedicated hardware, the controller 45 corresponds to, for example, a single circuit, a composite circuit, an ASIC, an FPGA, or a combination of these circuits. Functional units whose functions are fulfilled by the controller 45 may be respective separate hardware, or may be single hardware. It should be noted that ASIC is an abbreviation for application specific integrated circuit, and FPGA is an abbreviation for field-programmable gate array.

In the case where the controller 45 is a CPU, each of functions that are fulfilled by the controller 45 is fulfilled by software, firmware, or a combination of software and firmware. Each of software and firmware is described as a program, and stored in the memory 48. The CPU reads and executes the program stored in the memory 48, thereby fulfilling each function of the controller 45. The memory 48 is, for example, a non-volatile or volatile semiconductor memory such as a RAM, a ROM, a flash memory, an EPROM, or an EEPROM.

Some of the functions of the controller 45 may be fulfilled by dedicated hardware, and some other functions may be fulfilled by software or firmware. It should be noted that RAM is an abbreviation for random access memory. The ROM is an abbreviation for read only memory. The EPROM is an abbreviation for erasable programmable read only memory. The EEPROM is an abbreviation for electrically erasable programmable read only memory.

Figure 4:
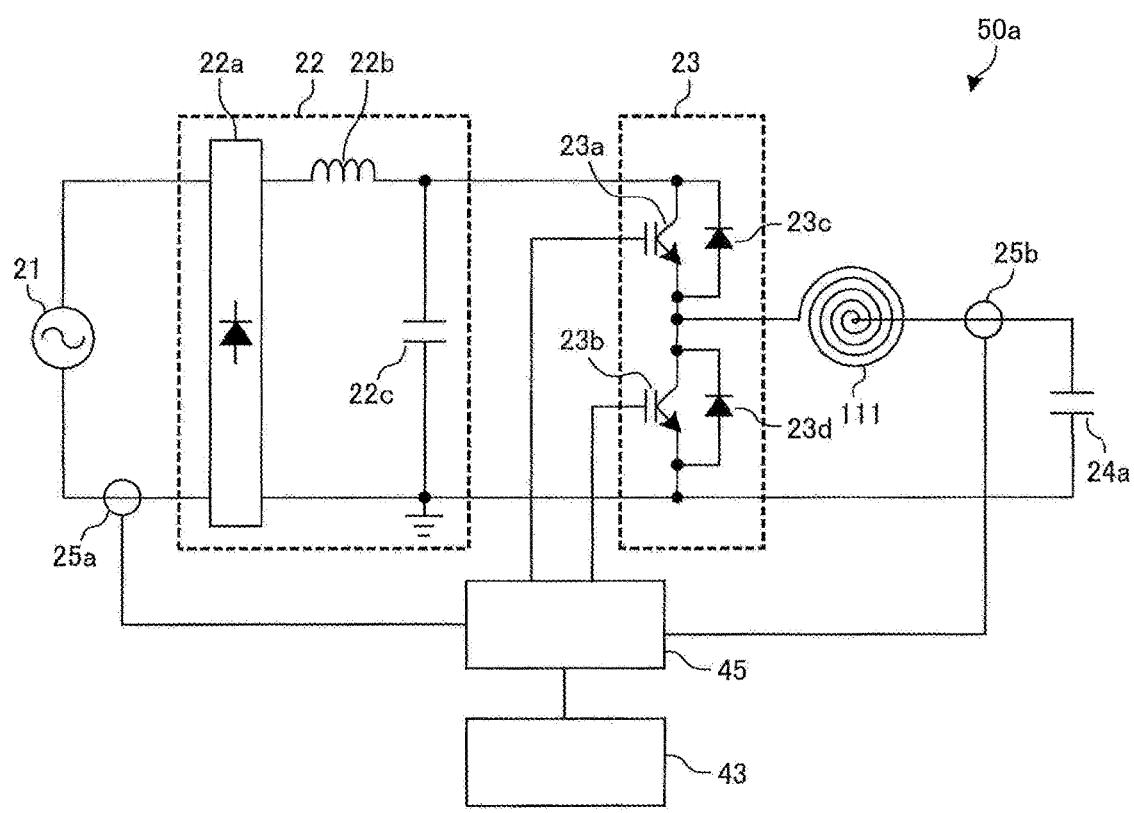
FIG. 4 is a diagram illustrating a drive circuit in the induction heating cooking apparatus according to Embodiment 1.

FIG. 4 is a diagram illustrating a drive circuit in the induction heating cooking apparatus according to Embodiment 1.

The drive circuits 50 are provided for the respective heating units. The drive circuits 50 may have the same circuit configuration, or may have different circuit configurations for the respective heating units. FIG. 4 illustrates the drive circuit 50a that drives the inner circumferential coil 111.

As illustrated in FIG. 4, the drive circuit 50a includes a DC power supply circuit 22, an inverter circuit 23, and a resonant capacitor 24a.

An input current detecting unit 25a is, for example, a current sensor. The input current detecting unit 25a detects a current that is input from an AC power supply 21 to the DC power supply circuit 22, and outputs a voltage signal corresponding to the value of the input current to the controller 45.

The DC power supply circuit 22 includes a diode bridge 22a, a reactor 22b, and a smoothing capacitor 22c. The DC power supply circuit 22 converts an AC voltage input from the AC power supply 21 into a DC voltage, and outputs the DC voltage to the inverter circuit 23.

In the inverter circuit 23, an IGBT 23a and an IGBT 23b that serve as switching elements are connected in series to the output of the DC power supply circuit 22. In the inverter circuit 23, a diode 23c and a diode 23d that serve as flywheel diodes are connected in parallel to the IGBT 23a and the IGBT 23b, respectively. The inverter circuit 23 is a so-called half-bridge inverter.

The IGBT 23a and the IGBT 23b are driven to be turned on and off by drive signals output from the controller 45. To be more specific, the controller 45 outputs drive signals for alternately turning on and off the IGBT 23a and the IGBT 23b such that the IGBT 23b is in the OFF state while the IGBT 23a is in the ON state, and such that the IGBT 23b is in the ON state while the IGBT 23a is in the OFF state. Because of the above, the inverter circuit 23 converts DC power output from the DC power supply circuit 22 into AC power having a high frequency of approximately 20 to 100 kHz, and supplies the AC power to a resonant circuit including the inner circumferential coil 111 and the resonant capacitor 24a.

The resonant capacitor 24a is connected in series to the inner circumferential coil 111. This resonant circuit has a resonant frequency corresponding to the inductance of the inner circumferential coil 111 and the capacitance of the resonant capacitor 24a. The inductance of the inner circumferential coil 111 changes depending on the characteristics of the object 5 that is a metal load, when the object 5 is magnetically coupled to the inner circumferential coil 111. Depending on this change in inductance, the resonant frequency of the resonant circuit changes.

By virtue of the above configuration, a high-frequency current of approximately several tens of amperes flows through the inner circumferential coil 111. Part of the object 5 placed on the top plate 4 that is located immediately above the inner circumferential coil 111 is inductively heated by a high-frequency magnetic flux generated by the high-frequency current that flows through the inner circumferential coil 111.

Each of the IGBT 23a and IGBT 23b that serve as switching elements is made of a silicon-based semiconductor material, but may be made of a wide bandgap semiconductor material that is silicon carbide, a gallium nitride-based material, or other materials.

By using a wide bandgap semiconductor as the switching element, it is possible to reduce the energization loss of the switching element. Furthermore, even when the driving frequency is set to a high frequency, that is, even when switching is performed at a high speed, heat transfer from the drive circuit 50a is satisfactory. Therefore, it is possible to reduce the size of heat transfer fins of the drive circuit 50, and thus to reduce the size and cost of the drive circuit 50a.

A coil current detecting unit 25b is connected to the resonant circuit that includes the inner circumferential coil 111 and the resonant capacitor 24a. The coil current detecting unit 25b includes, for example, a current sensor. The coil current detecting unit 25b detects a current that flows through the inner circumferential coil 111, and outputs a voltage signal corresponding to the value of the coil current to the controller 45.

The drive circuit 50a that drives the inner circumferential coil 111 is described above with reference to FIG. 4. The configuration of the drive circuit 50a as described above is the same as that of the drive circuit 50b that drives the intermediate coil 112 and that of the drive circuit 50c that drives the outer circumferential coil 113.

Although FIG. 4 illustrates a half-bridge drive circuit, needless to say, the drive circuit 50a may be a full-bridge drive circuit that includes four IGBTs and four diodes. The drive circuit 50a and the drive circuit 50b may be formed as full-bridge drive circuits, and share a pair of arms that include two switching elements connected in series to each other between positive and negative bus lines, and diodes respectively connected in anti-parallel to the switching elements.

Figure 5:
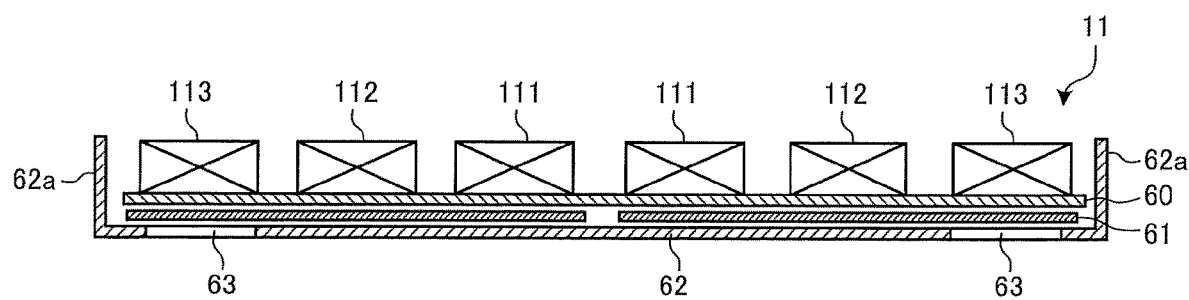
FIG. 5 is a vertical sectional view illustrating a first induction heating unit in the induction heating cooking apparatus according to Embodiment 1.

FIG. 5 is a vertical sectional view illustrating a first induction heating unit of the induction heating cooking apparatus according to Embodiment 1.

Figure 6:
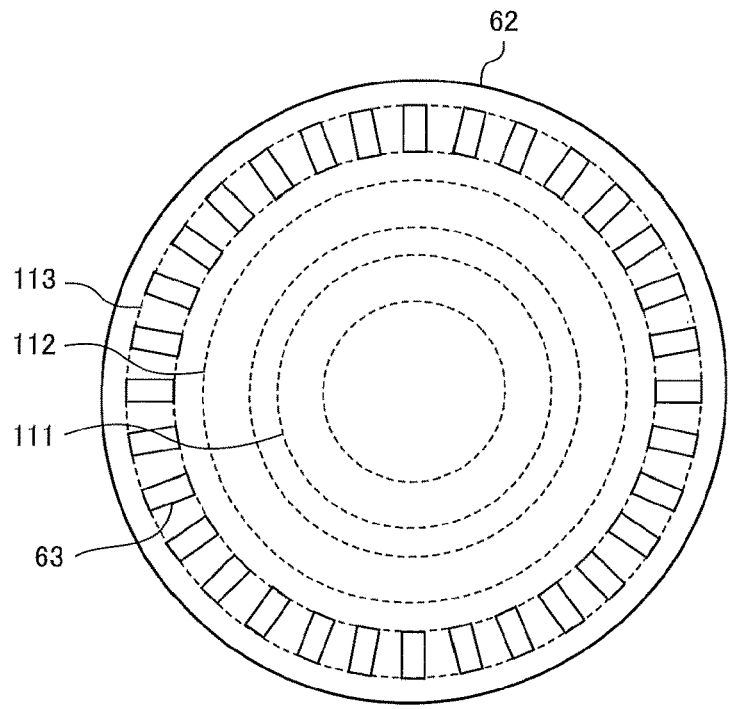
FIG. 6 is a plan view illustrating a supporting base in the induction heating cooking apparatus according to Embodiment 1.

FIG. 6 is a plan view illustrating a supporting base in the induction heating cooking apparatus according to Embodiment 1.

Figure 7:
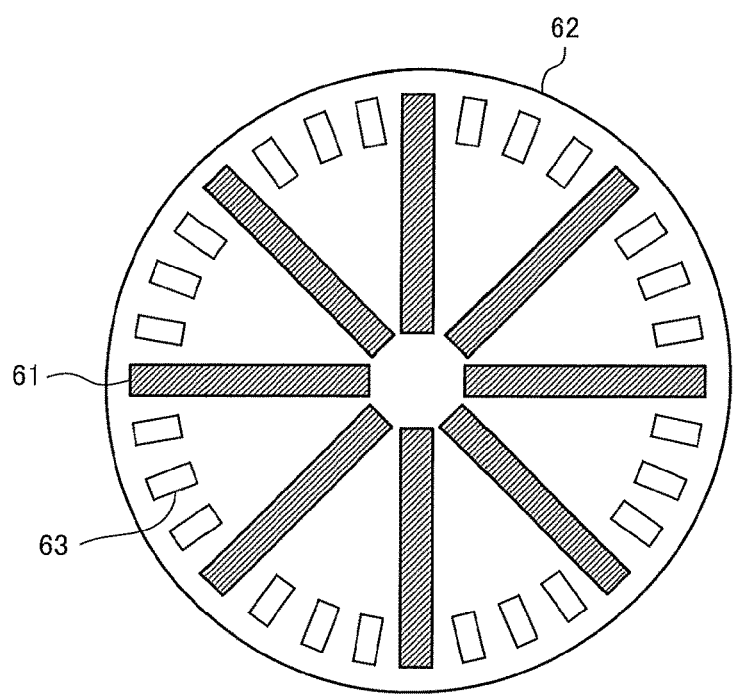
FIG. 7 is a plan view illustrating the supporting base and ferrites in the induction heating cooking apparatus according to Embodiment 1.

FIG. 7 is a plan view illustrating the supporting base and ferrites in the induction heating cooking apparatus according to Embodiment 1. It should be noted that FIGS. 5 to 7 schematically illustrate the arrangement and shapes of components.

As illustrated in FIG. 5, an insulator 60 is provided under the inner circumferential coil 111, the intermediate coil 112, and the outer circumferential coil 113. A plurality of ferrites 61 are provided under the insulator 60. A supporting base 62 is provided under the plurality of ferrites 61.

The insulator 60 is made of, for example, mica. The insulator 60 is formed in the shape of a flat plate. Each of the plurality of ferrites 61 is formed, for example, in the shape of a rod. For example, as illustrated in FIG. 7, eight ferrites 61 are arranged to extend radially from the center of the plurality of heating coils.

The supporting base 62 supports the plurality of ferrites 61, the insulator 60, the inner circumferential coil 111, the intermediate coil 112, and the outer circumferential coil 113. The supporting base 62 is made of a nonmagnetic body. The supporting base 62 is made of nonmagnetic metal such as aluminum or nonmagnetic stainless steel. The supporting base 62 is formed in the shape of a flat plate. The supporting base 62 serves as a shield that reduces the downward leakage of a magnetic field from the plurality of heating coils. The supporting base 62 also serves as a heat sink that transfers heat of the plurality of heating coils.

The supporting base 62 includes an annular portion 62a that is formed by upwardly projecting an outer circumferential end portion of the supporting base 62. The annular portion 62a serves as a shield that reduces the lateral leakage of a magnetic flux from the plurality of heating coils. The annular portion 62a may be formed as a separate unit from the supporting base 62. The annular portion 62a may be omitted.

The supporting base 62 has a plurality of openings 63 that are formed in part of the supporting base 62 that is located under the outer circumferential coil 113. As illustrated in FIG. 6, each of the plurality of openings 63 is formed, for example, in a rectangular shape. The shape of each of the plurality of openings 63 is not limited to a rectangular shape, and may be an arbitrary shape such as a circular shape or an elliptical shape. The plurality of openings 63 may be provided in part of the supporting base 62 that is located under the ferrites 61.

Next, the operation of the induction heating cooking apparatus according to Embodiment 1 will be described.

When the user places the object 5 on one of the heating zones and gives an instruction to start heating (supply heating power) to the operation and display portion 43, the material determining unit 46 of the controller 45 performs a material determining process.

Figure 8:
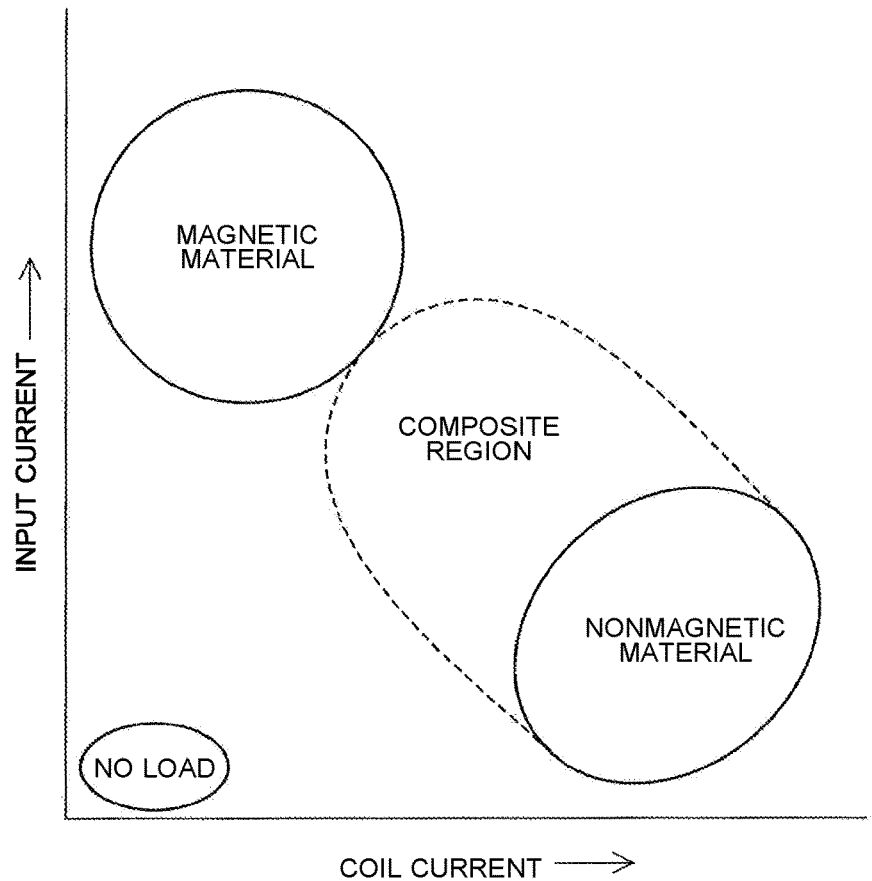
FIG. 8 is a material determining characteristic graph based on the relationship between a coil current and an input current in the induction heating cooking apparatus according to Embodiment 1.

FIG. 8 is a material determining characteristic graph based on the relationship between a coil current and an input current in the induction heating cooking apparatus according to Embodiment 1.

As illustrated in FIG. 8, the relationship between the coil current and the input current varies depending on the material of the load placed above each of the inner circumferential coil 111, the intermediate coil 112, and the outer circumferential coil 113. The controller 45 stores a material determining table in the memory 48 in advance. The material determining table is a table indicating the relationship between the coil current and the input current as indicated in FIG. 8.

In the material determining process, the controller 45 drives the inverter circuit 23 of each of the drive circuits 50a to 50c, with a specific drive signal for material determination, and detects an input current from a signal output from the input current detecting unit 25a. Furthermore, the controller 45 detects a coil current from a signal output from the coil current detecting unit 25b. The material determining unit 46 of the controller 45 determines the material of the load placed above the coil, based on the detected coil current and input current and the material determining table indicating the relationship indicated in FIG. 8.

The material of the load, that is, the object 5 to be heated, is roughly classified into a magnetic body such as iron or ferritic stainless steel (SUS 430), and a nonmagnetic body such as aluminum or copper. In addition, some objects 5 to be heated are made of a composite body in which a magnetic body is attached to a nonmagnetic body.

Figure 9:
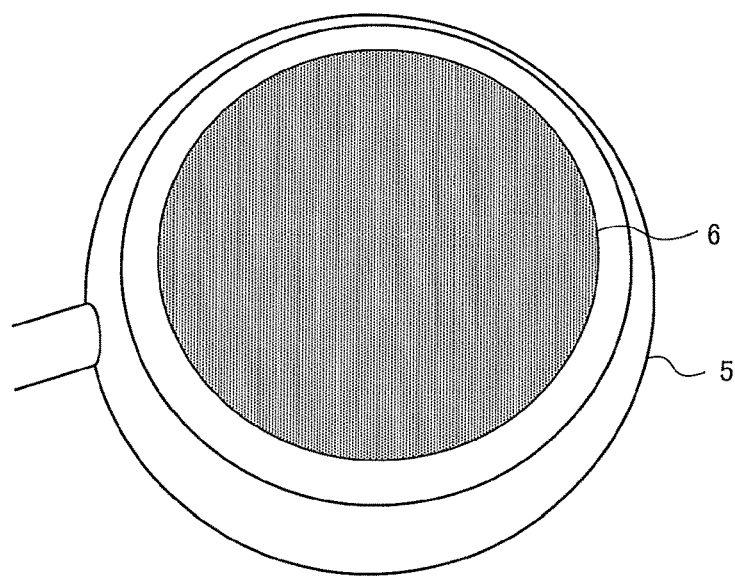
FIG. 9 is a diagram illustrating an object to be heated that is made of a composite body, and that is to be inductively heated by the induction heating cooking apparatus according to Embodiment 1.

FIG. 9 is a diagram illustrating an object to be heated that is made of a composite body, and that is to be inductively heated by the induction heating cooking apparatus according to Embodiment 1. FIG. 9 is a bottom view of the object 5.

As illustrated in FIG. 9, the object 5 made of a composite body is formed such that for example, a magnetic body 6 such as stainless steel is attached to a center portion of the bottom of a frying pan made of a nonmagnetic body such as aluminum. The magnetic body 6 is attached to the nonmagnetic body by an arbitrary method, for example, sticking, welding, thermal spraying, pressure bonding, fitting, clinching, or embedding.

In general, in an object 5 made of a composite body, the magnetic body 6 is attached to the flat center portion of the bottom surface of the base made of a nonmagnetic body, but is not attached to a curved outer circumferential portion of the bottom surface. When such an object 5 is placed on the heating zone, the magnetic body and the nonmagnetic body are located above the plurality of heating coils. That is, in the material determination, the load characteristics of a coil above which the magnetic body and the nonmagnetic body are located correspond to the characteristics of "composite region" between the characteristics of the magnetic body and the characteristics of the nonmagnetic body, as indicated in FIG. 8.

It should be noted that when a load is placed above the coil, the material to be determined by the material determining unit 46 is the material of part of the load that is located directly above the coil. For example, in the object 5 made of a composite body as illustrated in FIG. 9, the magnetic body 6 is located directly above the inner circumferential coil 111, and a nonmagnetic body that is the base of the object 5 is located directly above the magnetic body 6. In this case, the material determining unit 46 determines that the material of part of the load that is placed above the inner circumferential coil 111 is a magnetic body.

Subsequently, the controller 45 controls the drive circuits 50a to 50c based on the result of the determination made in the material determining process to perform a heating operation in which a high-frequency power depending on a heating power for induction heating is supplied.

In the following, a heating operation in the case where an object 5 made of a composite body is placed on a heating zone in the induction heating cooking apparatus 100 and a heating operation in the case where an object 5 formed only of a magnetic body is placed on the heating zone in the induction heating cooking apparatus 100 are described separately.

[Object 5 Made of Composite Material]

Figure 10:
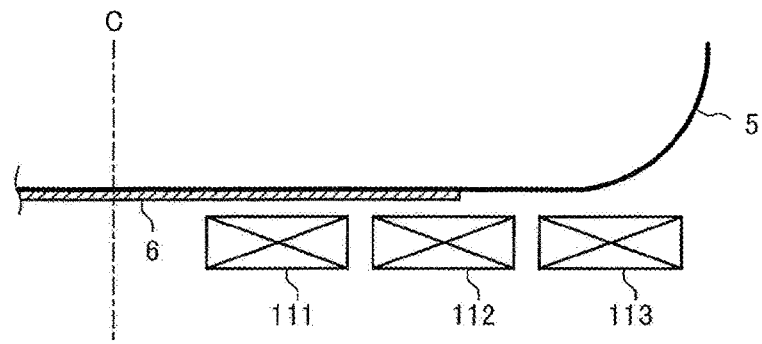
FIG. 10 is a diagram illustrating an object to be heated and heating coils in the induction heating cooking apparatus according to Embodiment 1.

FIG. 10 is a diagram illustrating an object to be heated and heating coils of the induction heating cooking apparatus according to Embodiment 1. It should be noted that FIG. 10 is a schematic vertical sectional view and illustrates a state in which the object 5 made of a composite body is placed on the heating zone. Furthermore, FIG. 10 illustrates portions of the inner circumferential coil 111, the intermediate coil 112, and the outer circumferential coil 113 that are located only on the right side with respect to the center C, but does not illustrate, for example, the top plate 4 or the supporting base 62.

As illustrated in FIG. 10, when the object 5 made of a composite body is placed on the heating zone in the induction heating cooking apparatus 100, the material determining unit 46 determines that the magnetic body 6 is located above the inner circumferential coil 111. Furthermore, the material determining unit 46 determines that the magnetic body 6 is located above part of the intermediate coil 112 and a nonmagnetic body is located above the other part of the intermediate coil 112. That is, the material determining unit 46 determines that the material of part of the object 5 that is located above the intermediate coil 112 is a composite body including a magnetic body and a nonmagnetic body. Also, the material determining unit 46 determines that a nonmagnetic body is located above the outer circumferential coil 113.

In the case where the material of part of the object 5 that is located above the inner circumferential coil 111 is a magnetic body, the material of part of the object 5 that is located above the intermediate coil 112 includes a magnetic body and a nonmagnetic body, and a nonmagnetic body is located above the outer circumferential coil 113, the controller 45 performs the following operation. The controller 45 operates the drive circuits 50a, 50b, and 50c. That is, the controller 45 supplies a high-frequency current to the inner circumferential coil 111, the intermediate coil 112, and the outer circumferential coil 113.

The controller 45 sets the frequency of the high-frequency current to be supplied from the drive circuit 50a to the inner circumferential coil 111 to a frequency that is set in advance as a frequency for the magnetic body, for example, 25 kHz. Also, the controller 45 sets the frequency of the high-frequency current to be supplied from the drive circuit 50b to the intermediate coil 112 to the frequency that is set in advance as the frequency for the magnetic body, for example, 25 kHz. Furthermore, the controller 45 sets the frequency of the high-frequency current to be supplied from the drive circuit 50c to the outer circumferential coil 113 to a frequency higher than the frequency of the high-frequency current to be supplied from the drive circuit 50a to the inner circumferential coil 111. For instance, the controller 45 sets the frequency of the high-frequency current to be supplied from the drive circuit 50c to the outer circumferential coil 113 to a frequency for the nonmagnetic body, for example, 90 kHz.

Then, the controller 45 controls the heating power (electric power) by changing the on-duty (on/off ratio) of the switching elements of the inverter circuit 23, whereby the object 5 placed on the top plate 4 is inductively heated.

The frequency of the high-frequency current to be supplied from the drive circuit 50c to the outer circumferential coil 113 is set higher than the frequencies of the high-frequency currents to be supplied to the intermediate coil 112 and the inner circumferential coil 111, for the following reason:

In order to inductively heat a nonmagnetic body made of a material such as aluminum, it is necessary to increase the impedance by reducing the skin depth of an eddy current generated in the object 5 and reducing a penetration volume Therefore, a high-frequency current (for example, higher than or equal to 75 kHz and lower than or equal to 100 kHz) is supplied to the outer circumferential coil 113 above which the nonmagnetic body is located, thereby generating a high-frequency eddy current in the nonmagnetic body, and as a result, enabling the object 5 to be sufficiently heated by Joule heat.

In contrast, a magnetic body made of a material such as iron has a high impedance for an eddy current. Therefore, even when a current with a frequency (for example, higher than or equal to 20 kHz and lower than or equal to 35 kHz) lower than the frequency of the high-frequency current to be supplied to the outer circumferential coil 113 is supplied to the intermediate coil 112 above which the composite body including the magnetic body and the nonmagnetic body is located, it is possible to sufficiently heat the object 5 with Joule heat generated by an eddy current.

When a plurality of heating coils close to each other are driven at the same time, an interference noise corresponding to the difference in driving frequency between the heating coils may be generated. In order to reduce such an interference noise, the controller 45 may set the driving frequency of the drive circuit 50c for the outer circumferential coil 113 to a frequency that is higher than the driving frequency of the drive circuit 50b for the intermediate coil 112 by an audible frequency or higher (approximately 20 kHz or higher). For example, when the driving frequency of the drive circuit 50c for the outer circumferential coil 113 is controlled to vary within a preset range, as well as a variable on-duty control described above, the lower limit of the driving frequency range of the drive circuit 50c for the outer circumferential coil 113 is set higher than the upper limit of the driving frequency range of the drive circuit 50c for the intermediate coil 112, by 20 kHz or higher. It should be noted that the maximum driving frequency of the outer circumferential coil 113 is, for example, 100 kHz. Thus, it is possible to reduce generation of interference noise when the intermediate coil 112 and the outer circumferential coil 113 close to each other are driven at the same time.

When a heating operation is performed such that the frequency of the high-frequency current to be supplied to the outer circumferential coil 113 is increased higher than the frequency of the high-frequency current to be supplied to the inner circumferential coil 111 as described above, an eddy current is also generated in the supporting base 62 made of a nonmagnetic body. That is, a linkage occurs between a magnetic flux from the outer circumferential coil 113 and the supporting base 62, and as a result, an eddy current is generated in part of the supporting base 62 that is located under the outer circumferential coil 113.

As illustrated in FIGS. 5 to 7, the supporting base 62 has the plurality of openings 63 under the outer circumferential coil 113. Therefore, generation of an eddy current in the supporting base 62 is reduced, as compared with the case where the supporting base 62 does not have the plurality of openings 63. Furthermore, the flow path of the eddy current generated in the supporting base 62 is divided by the plurality of openings 63; that is, induction heating of the supporting base 62 by a magnetic field from the outer circumferential coil 113 is reduced, as compared with the case where the supporting base 62 does not have the plurality of openings 63.

[Object 5 Made of Magnetic Body]

Figure 11:
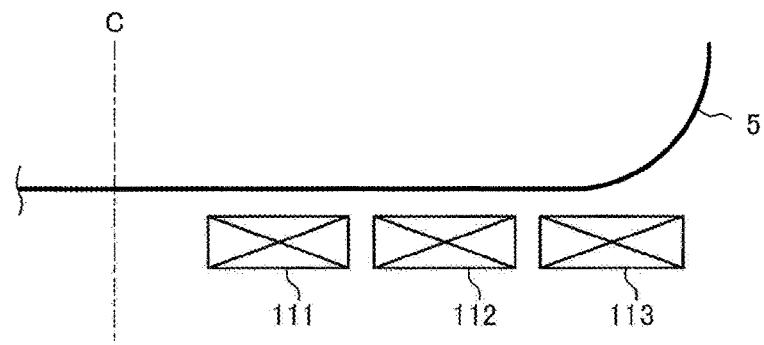
FIG. 11 is a diagram illustrating the heated object and the heating coils in the induction heating cooking apparatus according to Embodiment 1.

FIG. 11 is a diagram illustrating the object to be heated and the heating coils in the induction heating cooking apparatus according to Embodiment 1. It should be noted that FIG. 11 is a schematic vertical section and illustrates a state in which the object 5 made only of a magnetic body is placed on a heating zone. Furthermore, FIG. 11 illustrates the inner circumferential coil 111, the intermediate coil 112, and the outer circumferential coil 113 that are located only on the right side with respect to the center C, and does not illustrate, for example, the top plate 4 or the supporting base 62.

As illustrated in FIG. 11, when an object 5 made only of a magnetic material is placed on a heating zone in the induction heating cooking apparatus 100, the material determining unit 46 determines that a magnetic body is located above the inner circumferential coil 111, the intermediate coil 112, and the outer circumferential coil 113.

In the case where the material of the object 5 placed above the inner circumferential coil 111, the intermediate coil 112, and the outer circumferential coil 113 is a magnetic body, the controller 45 performs the following operation. The controller 45 operates the drive circuits 50a to 50c. That is, the controller 45 supplies a high-frequency current to the inner circumferential coil 111, the intermediate coil 112, and the outer circumferential coil 113.

Also, the controller 45 sets the frequency of the high-frequency current to be supplied from the drive circuit 50a, the drive circuit 50b, and the drive circuit 50c to a frequency that is set in advance as a frequency for the magnetic body, for example, 25 kHz.

Then, the controller 45 controls the heating power (electric power) by changing the on-duty (on/off ratio) of the switching elements of the inverter circuit 23, whereby the object 5 placed on the top plate 4 is inductively heated. It should be noted that since the supporting base 62 provided under the plurality of heating coils is made of a nonmagnetic body, induction heating caused by the magnetic field from the plurality of heating rarely occurs.

As described above, in Embodiment 1, the supporting base 62 is provided under the plurality of heating coils. The supporting base 62 is a flat plate made of a nonmagnetic body, and has the plurality of openings 63 under the outer circumferential coil 113. Therefore, when a heating operation is such that the frequency of the high-frequency current to be supplied to the outer circumferential coil 113 is increased higher than the frequency of the high-frequency current to be supplied to the inner circumferential coil 111, induction heating of the supporting base 62 by the magnetic field from the outer circumferential coil 113 is reduced. It is therefore possible to reduce a temperature rise of the supporting base 62 that is made of a nonmagnetic body. Also, it is possible to perform induction heating suitable for the material of the object 5 when inductively heating the object 5 made of a composite body.

Furthermore, in Embodiment 1, the insulator 60 is provided between the plurality of heating coils and the plurality of ferrites 61. Thus, the electrical insulation between the plurality of heating coils and the plurality of ferrites 61 can be improved. It is therefore possible to shorten the distance between the plurality of heating coils and the plurality of ferrites 61, and to reduce the size and thickness of the induction heating unit.

(Modification 1)

Figure 12:
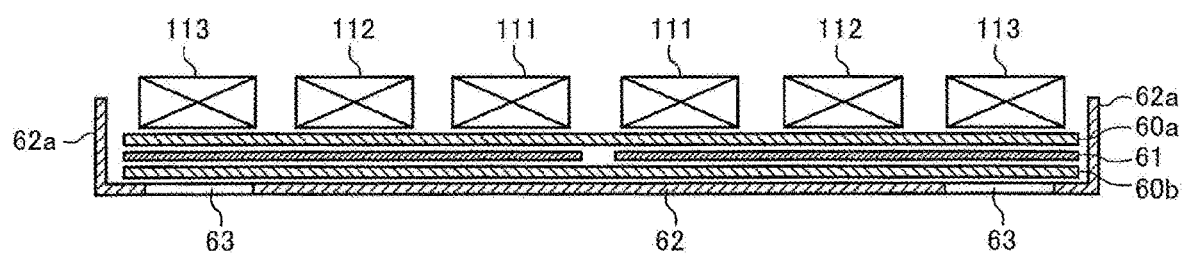
FIG. 12 is a vertical sectional view illustrating a first induction heating unit in modification 1 of the induction heating cooking apparatus according to Embodiment 1.

FIG. 12 is a vertical sectional view illustrating a first induction heating unit in modification 1 of the induction heating cooking apparatus according to Embodiment 1.

As illustrated in FIG. 12, a first induction heating unit 11 of modification 1 includes an insulator 60a provided between the plurality of heating coils and the ferrites 61, and an insulator 60b provided between the plurality of ferrites 61 and the supporting base 62.

By virtue of the above configuration, it is possible to improve the electrical insulation between the plurality of heating coils and the supporting base 62. Therefore, it is possible to shorten the distance between the plurality of heating coils and the supporting base 62, and to reduce the size and thickness of the induction heating unit.

It should be noted that the insulator 60a between the plurality of heating coils and the ferrites 61 may be omitted, and only the insulator 60b between the plurality of ferrites 61 and the supporting base 62 may be provided.

(Modification 2)

Figure 13:
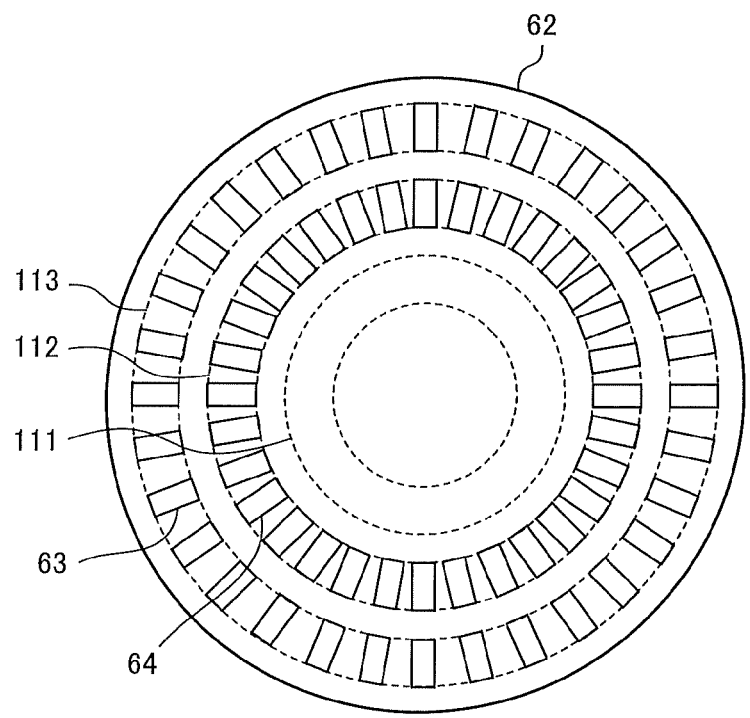
FIG. 13 is a plan view illustrating a supporting base in modification 2 of the induction heating cooking apparatus according to Embodiment 1.

FIG. 13 is a plan view illustrating a supporting base in modification 2 of the induction heating cooking apparatus according to Embodiment 1.

As illustrated in FIG. 13, in modification 2, a supporting base 62 has a plurality of openings 64 under the intermediate coil 112, in addition to the plurality of openings 63 under the outer circumferential coil 113. As illustrated in FIG. 13, each of the plurality of openings 64 is formed, for example, in a rectangular shape. The shape of each of the plurality of openings 64 is not limited to a rectangular shape, and may be an arbitrary shape such as a circular shape or an elliptical shape. The plurality of openings 64 may be provided under the ferrites 61.

By virtue of the above configuration, when a heating operation is performed such that the frequency of the high-frequency current to be supplied to the intermediate coil 112 is increased higher than the frequency of the high-frequency current to be supplied to the inner circumferential coil 111, induction heating of the supporting base 62 by a magnetic field from the intermediate coil 112 is reduced. It is therefore possible to reduce a temperature rise of the supporting base 62 made of a nonmagnetic body.

In the following, a specific example of a heating operation in which the frequency of the high-frequency current to be supplied to the intermediate coil 112 is increased higher than the frequency of the high-frequency current to be supplied to the inner circumferential coil 111 is described with reference to FIG. 14.

Figure 14:
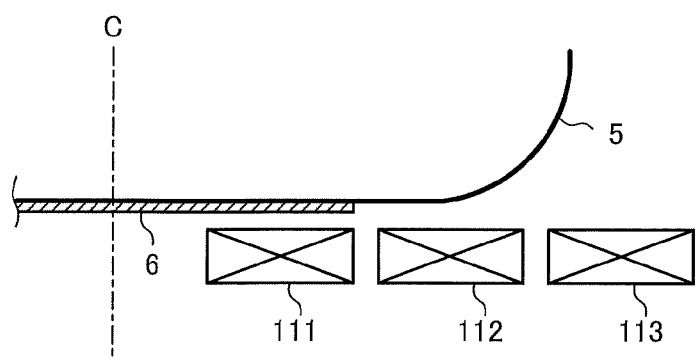
FIG. 14 is a diagram illustrating an object to be heated and heating coils in modification 2 of the induction heating cooking apparatus according to Embodiment 1.

FIG. 14 illustrates an object to be heated and heating coils in modification 2 of the induction heating cooking apparatus according to Embodiment 1. It should be noted that FIG. 14 is a schematic vertical section and illustrates a state in which the object 5 made of a composite body is placed on a heating zone. Furthermore, FIG. 14 illustrates portions of the inner circumferential coil 111, the intermediate coil 112, and the outer circumferential coil 113 that are located only on the right side with respect to the center C, and does not illustrate, for example, the top plate 4 or the supporting base 62.

As illustrated in FIG. 14, in the case where the magnetic body 6 of the object 5 made of a composite body is located only above the inner circumferential coil 111, that is, an end portion of the magnetic body 6 is located between the inner circumferential coil 111 and the intermediate coil 112, the controller 45 performs the following operation.

The material determining unit 46 of the controller 45 determines that the magnetic body 6 is located above the inner circumferential coil 111. Also, the material determining unit 46 determines that a nonmagnetic body is located above the intermediate coil 112. Furthermore, the material determining unit 46 determines that no load is applied to the outer circumferential coil 113.

In the case where the material of part of the object 5 that is located above the inner circumferential coil 111 is a magnetic body, the material of part of the object 5 that is located placed above the intermediate coil 112 is a nonmagnetic body, and no load is applied to the outer circumferential coil 113, the controller 45 performs the following operation. The controller 45 operates the drive circuits 50a and 50b, and stops the operation of the drive circuit 50c. That is, the controller 45 supplies a high-frequency current to the inner circumferential coil 111 and the intermediate coil 112, and stops supply of a high-frequency current to the outer circumferential coil 113.

The controller 45 sets the frequency of the high-frequency current to be supplied from the drive circuit 50a to the inner circumferential coil 111 to a frequency that is set in advance as a frequency for the magnetic body, for example, 25 kHz. Furthermore, the controller 45 sets the frequency of the high-frequency current to be supplied from the drive circuit 50b to the intermediate coil 112 to a frequency higher than the frequency of the high-frequency current to be supplied from the drive circuit 50a to the inner circumferential coil 111. For instance, the controller 45 sets the frequency of the high-frequency current to be supplied from the drive circuit 50b to the intermediate coil 112 to a frequency for the nonmagnetic body, for example, 90 kHz.

Then, the controller 45 controls the heating power (electric power) by changing the on-duty (on/off ratio) of the switching elements of the inverter circuit 23. Thus, the object 5 placed on the top plate 4 is inductively heated.

By virtue of the above operation, it is possible to perform induction heating suitable for the material of the object 5 when inductively heating the object 5 made of a composite body. Furthermore, generation of an eddy current in the supporting base 62 located under the intermediate coil 112 is reduced, as compared with the case where the supporting base 62 does not have the plurality of openings 64. That is, induction heating of the supporting base 62 by the magnetic field from the intermediate coil 112 is reduced, as compared with the case where the supporting base 62 does not have the plurality of openings 64.

Embodiment 2

The configuration of an induction heating cooking apparatus of Embodiment 2 will be described by referring mainly to the differences between Embodiment 2 and Embodiment 1 described above. It should be noted that regarding Embodiment 2, components that are the same as those of Embodiment 1 will be denoted by the same reference signs, and their descriptions will thus be omitted.

Figure 15:
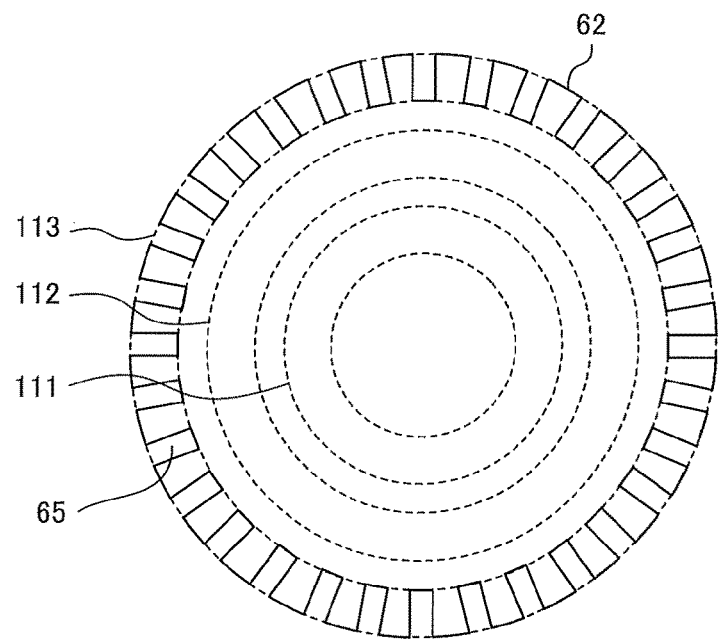
FIG. 15 is a plan view illustrating a supporting base in an induction heating cooking apparatus according to Embodiment 2.

FIG. 15 is a plan view illustrating a supporting base in the induction heating cooking apparatus according to Embodiment 2.

Figure 16:
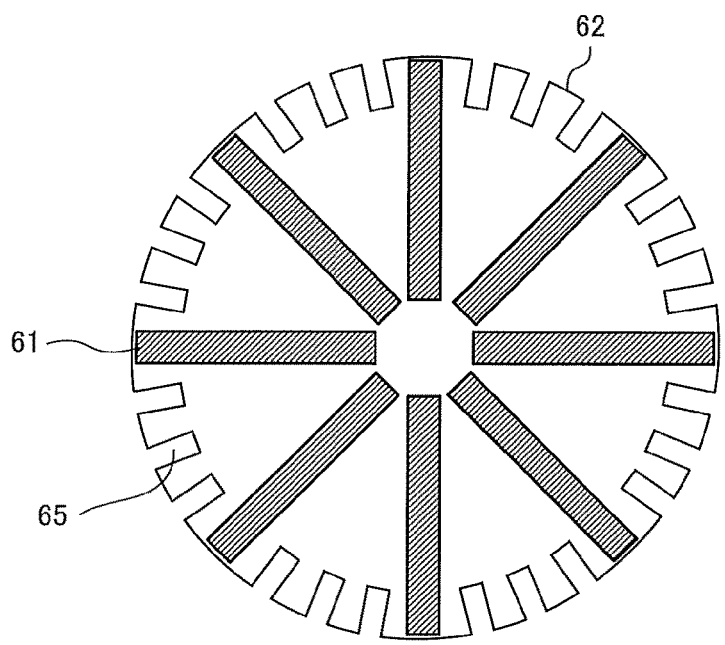
FIG. 16 is a plan view illustrating the supporting base and ferrites in the induction heating cooking apparatus according to Embodiment 2.

FIG. 16 is a plan view illustrating the supporting base and ferrites in the induction heating cooking apparatus according to Embodiment 2. It should be noted that FIGS. 15 and 16 schematically illustrate the configuration and shape of each component.

As illustrated in FIGS. 15 and 16, a supporting base 62 has a plurality of notches 65 under the outer circumferential coil 113. That is, the supporting base 62 has openings that are a plurality of notches 65 provided in an outer circumferential edge of the supporting base 62. Each of the plurality of notches 65 is formed, for example, in a rectangular shape. The shape of each of the plurality of notches 65 is not limited to a rectangular shape, and may be an arbitrary shape such as a semicircular shape or a triangular shape.

In the above configuration also, as in Embodiment 1 described above, induction heating of the supporting base 62 by the magnetic field from the outer circumferential coil 113 is reduced, and a temperature rise of the supporting base 62 can be reduced.

It should be noted that the plurality of notches 65 may be formed to extend from the outer circumferential edge of the supporting base 62 to part of the supporting base 62 that is located under the intermediate coil 112. By virtue of such a configuration, as in modification 2 of Embodiment 1 described above, induction heating of the supporting base 62 by the magnetic field from the intermediate coil 112 is reduced, and a temperature rise of the supporting base 62 can be reduced.

Embodiment 3

The configuration of an induction heating cooking apparatus according to Embodiment 3 will be described by referring mainly to the differences between Embodiment 3 and Embodiment 1 described above. It should be noted that regarding Embodiment 3, components that are the same as those in Embodiment 1 will be denoted by the same reference signs, and their descriptions will thus be omitted.

Figure 17:
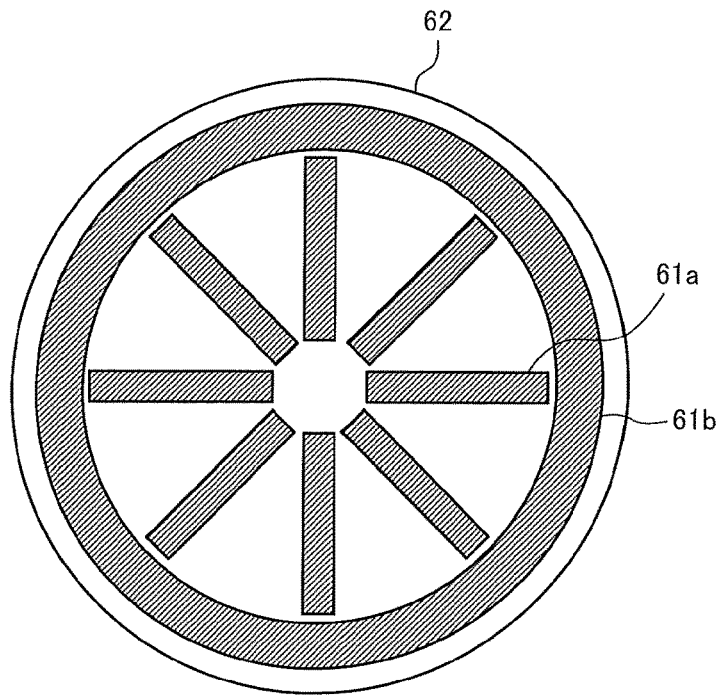
FIG. 17 is a plan view illustrating a supporting base and ferrites in an induction heating cooking apparatus according to Embodiment 3.

FIG. 17 is a plan view illustrating a supporting base and ferrites in the induction heating cooking apparatus according to Embodiment 3.

Figure 18:
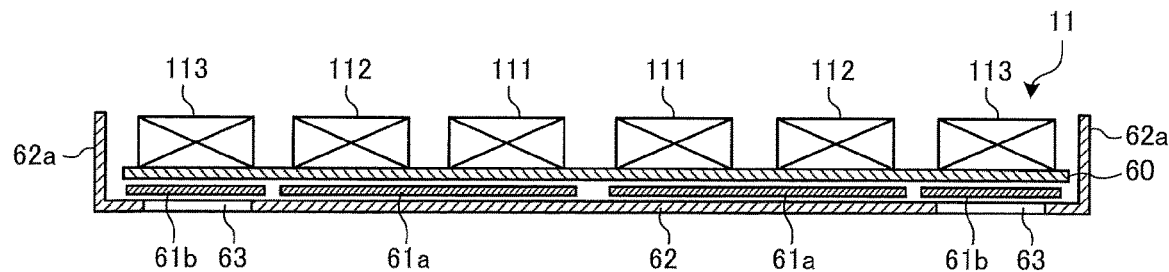
FIG. 18 is a vertical sectional view illustrating a first induction heating unit in the induction heating cooking apparatus according to Embodiment 3.

FIG. 18 is a vertical sectional view illustrating a first induction heating unit of the induction heating cooking apparatus according to Embodiment 3. It should be noted that FIGS. 17 and 18 schematically illustrate the configuration and shape of each component.

As illustrated in FIGS. 17 and 18, a plurality of ferrites 61a and a ferrite 61b are provided under the insulator 60. Each of the plurality of ferrites 61a is formed, for example, in the shape of a rod. For example, as illustrated in FIG. 17, eight ferrites 61a are provided under the inner circumferential coil 111 and the intermediate coil 112 in such a manner as to extend radially from the center of the plurality of heating coils. The ferrite 61b is provided under the outer circumferential coil 113. The ferrite 61b is formed in an annular shape having substantially the same width as the outer circumferential coil 113, as viewed in plan view. That is, the area of the ferrite 61b located under the outer circumferential coil 113 is greater than the area of the plurality of ferrites 61a located under the inner circumferential coil 111, as viewed in plan view.

The shape of the ferrite 61b located under the outer circumferential coil 113 is not limited to an annular shape, and may be an arbitrary shape. That is, the ferrite 61b located under the outer circumferential coil 113 may be any shape as long as that the area of the ferrite 61b located under the outer circumferential coil 113 is greater than the area of the ferrites 61a located under the inner circumferential coil 111 as viewed in plan view. For example, a plurality of ferrites each formed in the shape of a rod may be provided under the outer circumferential coil 113.

By virtue of the above configuration, a high-frequency magnetic flux generated from the outer circumferential coil 113 passes through the ferrite 61b, thereby reducing the amount of magnetic flux that crosses the supporting base 62 provided under the ferrite 61b. Thus, induction heating of the supporting base 62 by the magnetic field from the outer circumferential coil 113 is reduced. It is therefore possible to reduce a temperature rise of the supporting base 62 made of a nonmagnetic body.

Moreover, since the ferrite 61b is provided under the outer circumferential coil 113 in addition to the configuration of Embodiment 1 or 2 described above, it is possible to reduce the leakage of the magnetic flux from the plurality of openings 63 or the plurality of notches 65 formed in the supporting base 62 to a lower region provided under the supporting base 62.

It should be noted that as in modification 2 of Embodiment 1 described above, a plurality of openings 64 may be formed under the intermediate coil 112. Also, as in Embodiment 2, a plurality of notches 65 may be formed to extend from the outer circumferential edge of the supporting base 62 to part of the supporting base 62 that is located under the intermediate coil 112. As a result, as in modification 2 of Embodiment 1 described above, induction heating of the supporting base 62 by the magnetic field from the intermediate coil 112 is reduced, and a temperature rise of the supporting base 62 can be reduced.

It should be noted that in Embodiment 3, the supporting base 62 may be configured that none of the plurality of openings 63, the plurality of openings 64, and the plurality of notches 65 are provided. In this configuration also, the amount of magnetic flux that crosses the supporting base 62 provided under the ferrite 61b can be reduced by the ferrite 61b alone, and induction heating of the supporting base 62 by the magnetic field from the outer circumferential coil 113 is reduced. Therefore, it is possible to reduce a temperature rise of the supporting base 62 made of a nonmagnetic body.

(Modification 1)

The ferrite 61b located under the outer circumferential coil 113 may be made of a material having different frequency characteristics from those of the ferrites 61a located under the inner circumferential coil 111. To be more specific, the ferrite 61b located under the outer circumferential coil 113 may have a lower magnetic resistance at high frequency than a magnetic resistance of the ferrites 61a located under the inner circumferential coil 111 at high frequency. It should be noted that the above "high frequency" means the frequency of the high-frequency current to be supplied to the outer circumferential coil 113 in the heating operation in which the frequency of the high-frequency current to be supplied to the outer circumferential coil 113 is increased higher than the frequency of the high-frequency current to be supplied to the inner circumferential coil 111. For example, the magnetic resistance of the ferrite 61b against the magnetic field at a frequency for the nonmagnetic body, for example, 90 kHz, is less than the magnetic resistance of the ferrites 61a.

With the above configuration, the loss of the ferrite 61b located under the outer circumferential coil 113 can be reduced. Therefore, it is possible to further reduce the temperature rise of the supporting base 62 made of a nonmagnetic body, in the heating operation in which the frequency of the high-frequency current to be supplied to the outer circumferential coil 113 is increased higher than the frequency of the high-frequency current to be supplied to the inner circumferential coil 111.

(Modification 2)

Figure 19:
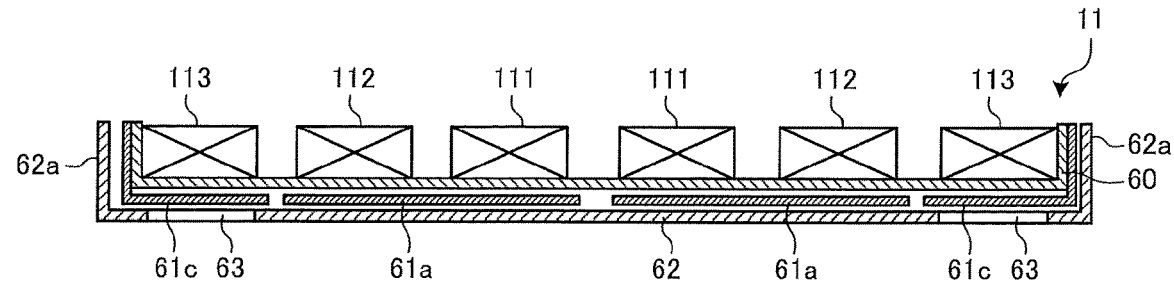
FIG. 19 is a vertical sectional view illustrating a first induction heating unit in modification 2 of the induction heating cooking apparatus according to Embodiment 3.

FIG. 19 is a vertical sectional view illustrating a first induction heating unit in modification 2 of the induction heating cooking apparatus according to Embodiment 3.

As illustrated in FIG. 19, a ferrite 61c located under the outer circumferential coil 113 is configured such that an end portion of the ferrite 61c that is located on an outer circumferential side of the outer circumferential coil 113 is formed in the shape of a projection that projects upwards along a side surface of the outer circumferential coil 113. That is, the ferrite 61c located under the outer circumferential coil 113 has an L-shaped section.

By virtue of the above configuration, the amount of the magnetic flux directed to the object 5 placed on the top plate 4 is increased because of the projection shape of the above portion of the ferrite 61c, and the heating efficiency can be improved, as compared with the case where the ferrite has no portion that is formed in the shape of a projection. Also, a linkage does not easily occur between the magnetic flux generated from the outer circumferential coil 113 and the supporting base 62, and the temperature rise of the supporting base 62 can be further reduced, as compared with the case where the ferrite has no portion that is formed in the shape of a projection.

(Modification 3)

Figure 20:
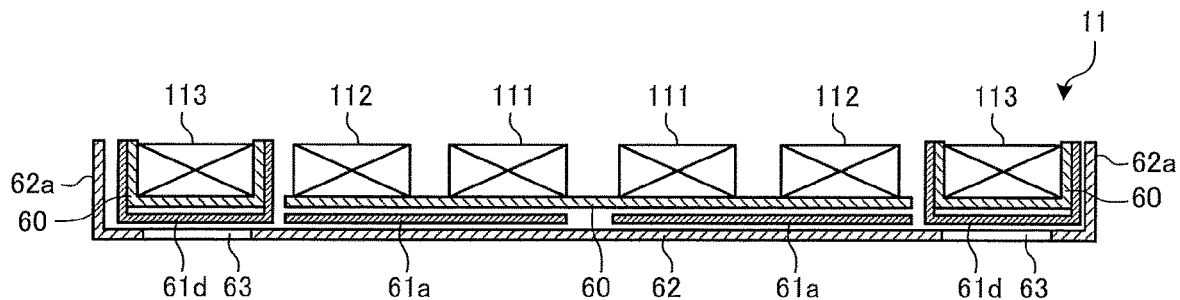
FIG. 20 is a vertical sectional view illustrating a first induction heating unit in modification 3 of the induction heating cooking apparatus according to Embodiment 3.

FIG. 20 is a vertical sectional view illustrating a first induction heating unit in modification 3 of the induction heating cooking apparatus according to Embodiment 3. As illustrated in FIG. 20, a ferrite 61d located under the outer circumferential coil 113 is configured such that an end portion of the ferrite 61d that is located on the outer circumferential side of the outer circumferential coil 113 is formed in the shape of a projection that projects upwards along a side surface of the outer circumferential coil 113. Furthermore, the ferrite 61d located under the outer circumferential coil 113 is configured such that an end portion of the ferrite 61d that is located on the inner circumferential side of the outer circumferential coil 113 is formed in the shape of a projection that projects upwards along another side surface of the outer circumferential coil 113. That is, the ferrite 61d located under the outer circumferential coil 113 has a U-shaped section.

With this configuration, the amount of magnetic flux directed to the object 5 placed on the top plate 4 is increased because of the projection shape of the above portion of the ferrite 61d, and the heating efficiency can be improved, as compared with the case where the ferrite has no portion that is formed in the shape of a projection. Also, a linkage does not easily occur between the magnetic flux generated from the outer circumferential coil 113 and the supporting base 62, and the temperature rise of the supporting base 62 can further be reduced, as compared with the case where the ferrite has no portion that is formed in the shape of a projection.

It should be noted that a ferrite may be formed such that only the portion of the ferrite that is located on the inner circumferential side of the outer circumferential coil 113 is formed in the shape of a projection, and the portion of the ferrite that is located on the outer circumferential side of the outer circumferential coil 113 is not formed in the shape of a projection.

Embodiment 4

The configuration of an induction heating cooking apparatus of Embodiment 4 will be described by referring mainly to the differences between Embodiment 4 and Embodiments 1 to 3 described above. It should be noted that regarding Embodiment 4, components that are the same as those in any of Embodiments 1 to 3 will be denoted by the same reference sigs, and their descriptions will thus be omitted.

Figure 21:
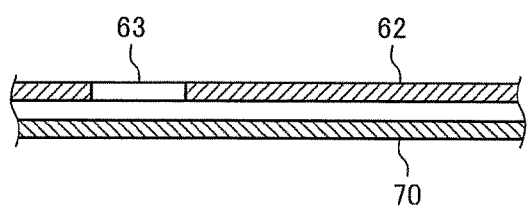
FIG. 21 is a vertical sectional view illustrating a supporting base and a magnetic shield member in an induction heating cooking apparatus according to Embodiment 4.

FIG. 21 is a vertical sectional view illustrating a supporting base and a magnetic shield member in an induction heating cooking apparatus according to Embodiment 4. It should be noted that FIG. 21 schematically illustrates the configuration and shape of each component. Moreover, FIG. 21 illustrates only related part of a supporting base 62 and a magnetic shield member 70.

As illustrated in FIG. 21, the magnetic shield member 70 is provided under openings 63 of the supporting base 62. The magnetic shield member 70 is spaced from the lower surface of the supporting base 62. The magnetic shield member 70 is made of a flat metal plate. The magnetic shield member 70 is made of, for example, a magnetic sheet or magnetic metal.

With this configuration, the magnetic shield member 70 can shut out a magnetic field that leaks downwards from the openings 63 of the supporting base 62. Therefore, induction heating of the supporting base 62 by the magnetic field from the outer circumferential coil 113 is reduced by the plurality of openings 63 formed in the supporting base 62, and the downward leakage of the magnetic field from the plurality of openings 63 is reduced. Furthermore, since the downward leakage of the magnetic field is reduced, electric components such as a substrate can be provided under the induction heating unit, thus improving the flexibility of arrangement of components.

In the example illustrated in FIG. 21, the magnetic shield member 70 is provided in the entirety of areas that are located under the openings 63 of the supporting base 62. However, this illustration is not limiting. As long as the magnetic shield member 70 is provided in part of the areas under the openings 63 of the supporting base 62, the downward leakage of the magnetic field from the plurality of openings 63 can be reduced.

(Modification 1)

Figure 22:
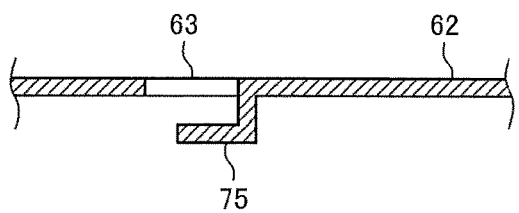
FIG. 22 is a vertical sectional view illustrating a supporting base and magnetic shield members in modification 1 of the induction heating cooking apparatus according to Embodiment 4.

FIG. 22 is a vertical sectional view illustrating a supporting base and magnetic shield members in modification 1 of the induction heating cooking apparatus according to Embodiment 4.

Figure 23:
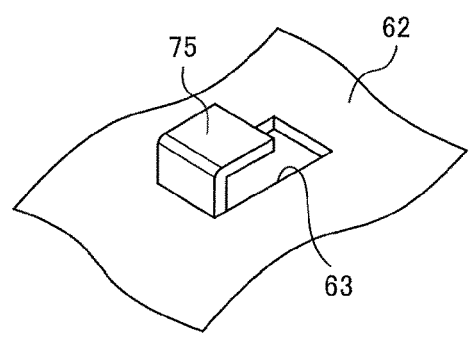
FIG. 23 is a perspective view illustrating the supporting base and the magnetic shield members in modification 1 of the induction heating cooking apparatus according to Embodiment 4.

FIG. 23 is a perspective view illustrating the supporting base and the magnetic shield members in modification 1 of the induction heating cooking apparatus according to Embodiment 4. It should be noted that FIGS. 22 and 23 schematically illustrate the configuration and shape of each component. Further, FIGS. 22 and 23 illustrate only related part of a supporting base 62 and magnetic shield members 75. FIG. 23 is a perspective view of the supporting base 62 as viewed from below.

As illustrated in FIGS. 22 and 23, an end portion of each of the magnetic shield members 75 of modification 1 is connected to part of an edge of an associated one of openings 63 of the supporting base 62. For example, the magnetic shield members 75 are formed integrally with the supporting base 62, by forming the openings 63 in the supporting base 62 by cutting and raising part of the supporting base 62. To be more specific, each of the openings 63 of the supporting base 62 and each of the magnetic shield members 75 are formed as follows. A U-shaped cut is made in part of the supporting base 62, and uncut part of the part is bent downwards and formed to have an L-shaped vertical section, whereby the opening 63 and the magnetic shield member 75 are integrally formed.

With this configuration, each magnetic shield member 75 can shut out a magnetic field that leaks downwards from an associated one of the openings 63 in the supporting base 62. Also, the magnetic shield member 75 can be formed without adding any further component. Accordingly, the manufacturing cost can be reduced.

Since the magnetic shield members 75 of modification 1 are made of the same material as the supporting base 62 that is a nonmagnetic body, an eddy current may be generated by a magnetic field that leaks from the openings 63. However, the magnetic shield members 75 are located under the supporting base 62, and located further away from the outer circumferential coil 113 than the supporting base 62 is. Thus, the magnetic field strength of a magnetic flux in which a linkage with each of the magnetic shield members 75 occurs is reduced. Therefore, induction heating of the supporting base 62 by the magnetic field from the outer circumferential coil 113 is reduced, as compared with the case where the magnetic shield members 75 are not provided.

(Modification 2)

Figure 24:
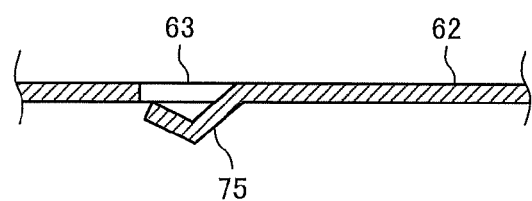
FIG. 24 is a vertical sectional view illustrating a supporting base and magnetic shield members in modification 2 of the induction heating cooking apparatus according to Embodiment 4.

FIG. 24 is a vertical sectional view illustrating a supporting base and magnetic shield members in modification 2 of the induction heating cooking apparatus according to Embodiment 4. It should be noted that FIG. 24 schematically illustrates the configuration and shape of each component. Furthermore, FIG. 24 illustrates only related part of a supporting base 62 and magnetic shield members 75.

In modification 1 described above, each magnetic shield member 75 has an L shaped vertical section. However, this is not limiting. For example, as illustrated in FIG. 24, the magnetic shield member 75 is formed by making a U-shaped cut in part of the supporting base 62 and then bending uncut part of the above part downwards such that the uncut part has a V-shaped vertical section. As a result, an associated opening 63 and the magnetic shield member 75 are integrally formed.

In the above configuration also, it is possible to obtain the same advantages as in modification 1 described above.

(Modification 3)

Figure 25:
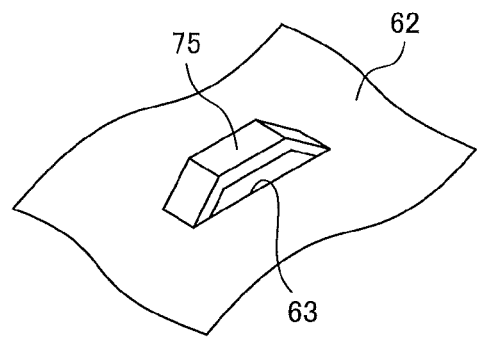
FIG. 25 is a perspective view illustrating a supporting base and magnetic shield members in modification 3 of the induction heating cooking apparatus according to Embodiment 4.

FIG. 25 is a perspective view illustrating a supporting base and magnetic shield members in modification 3 of the induction heating cooking apparatus according to Embodiment 4. It should be noted that FIG. 25 schematically illustrates the configuration and shape of each component. Furthermore, FIG. 25 illustrates only related part of a supporting base 62 and magnetic shield members 75. FIG. 25 is a perspective view of the supporting base 62 as viewed from below.

The magnetic shield members 75 of each of modifications 1 and 2 are each formed by making a U-shaped cut in part of the supporting base 62 and bending uncut part of the above part downwards such that an associated opening 63 and magnetic shield member 75 are integrally formed. However, this is not limiting. For example, as illustrated in FIG. 25, the magnetic shield member 75 is formed by making two parallel linear cuts in the supporting base 62, and deforming part of the supporting base 62 that is located between the two parallel linear cuts downwards such that the part has a trapezoidal vertical section. As a result, the opening 63 and the magnetic shield member 70 are integrally formed.

In the above configuration also, it is possible to obtain the same advantages as in modification 1 described above.

Embodiment 5

Embodiment 5 will be described by referring mainly to the differences between Embodiment 5 and Embodiments 1 to 4 described above. It should be noted that regarding Embodiment 5, components that are the same as those in any of Embodiments 1 to 4 will be denoted by the same reference signs, and their descriptions will thus be omitted.

In Embodiments 1 to 4, the inner circumferential coil 111, the intermediate coil 112, and the outer circumferential coil 113 are concentrically arranged. However, the number and configuration of heating coils are not limited to the above number and configuration. They will be specifically described.

Figure 26:
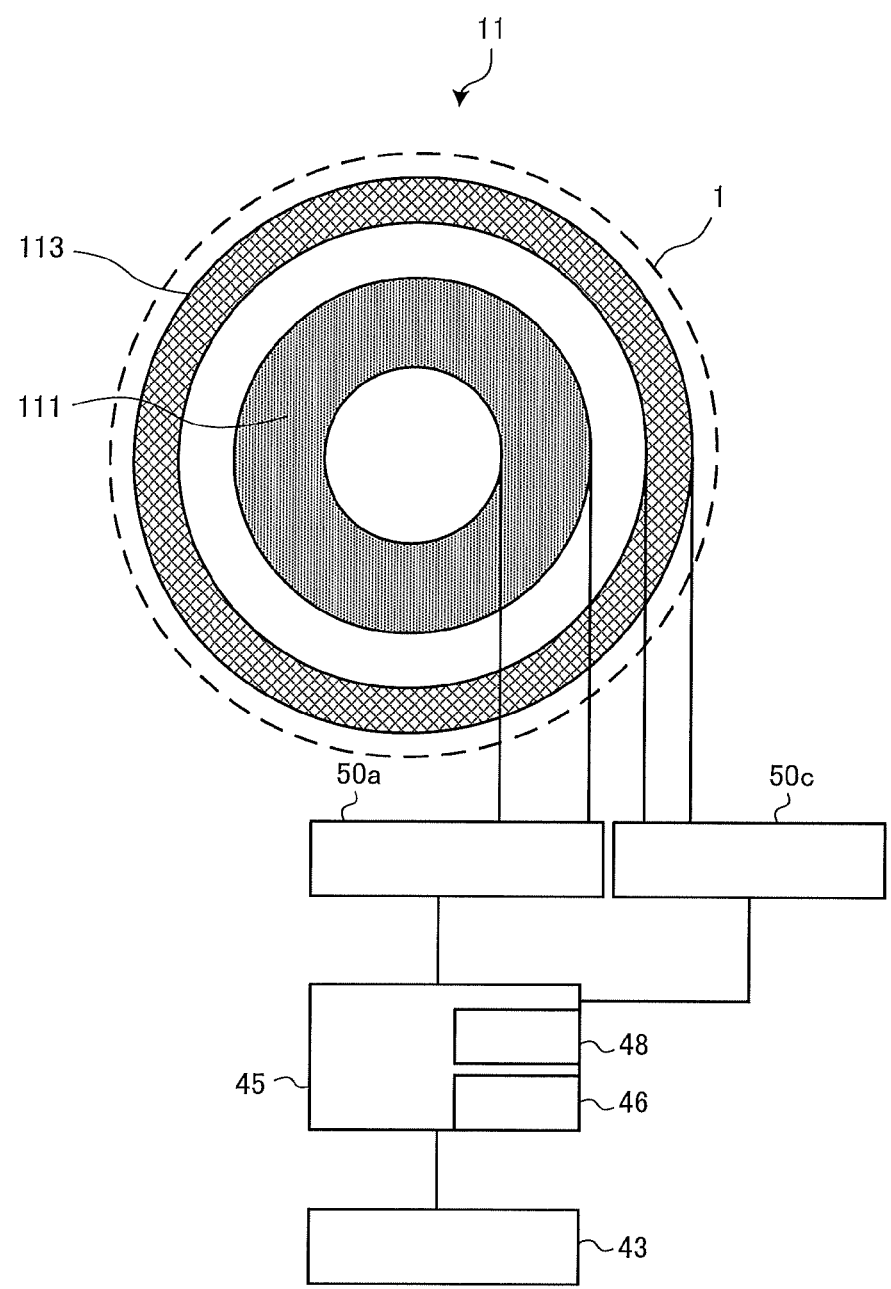
FIG. 26 is a block diagram illustrating a configuration of an induction heating cooking apparatus according to Embodiment 5.

FIG. 26 is a block diagram illustrating a configuration of the induction heating cooking apparatus according to Embodiment 5.

As illustrated in FIG. 26, a first induction heating unit 11 includes an inner circumferential coil 111 provided at the center of the first induction heating zone 1, and an outer circumferential coil 113 provided on an outer circumferential side of the inner circumferential coil 111. The inner circumferential coil 111 is driven and controlled by a drive circuit 50a. The outer circumferential coil 113 is driven and controlled by a drive circuit 50c. That is, the first induction heating unit 11 in Embodiment 5 does not include an intermediate coil 112. Nor does the first induction heating unit 11 include a drive circuit 50b.

In the case where the material of part of the object 5 that is located above the inner circumferential coil 111 is a magnetic body, and a nonmagnetic body is located above the outer circumferential coil 113, the controller 45 performs the following operation. The controller 45 sets the frequency of the high-frequency current to be supplied from the drive circuit 50c to the outer circumferential coil 113 to a frequency higher than the frequency of the high-frequency current to be supplied from the drive circuit 50a to the inner circumferential coil 111.

In the above configuration also, it is possible to perform induction heating suitable for the material of the object 5 when inductively heating the object 5 made of a composite body.

(Modification 1)

Figure 27:
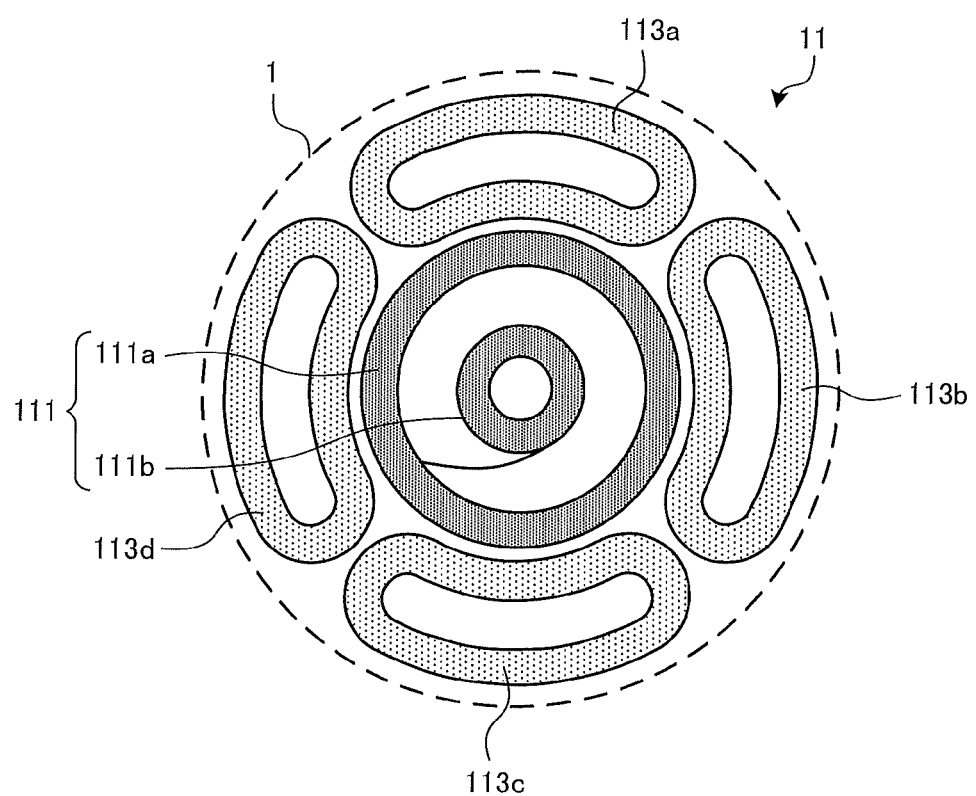
FIG. 27 is a plan view illustrating a first induction heating unit in modification 1 of the induction heating cooking apparatus according to Embodiment 5.

FIG. 27 is plan view illustrating a first induction heating unit in modification 1 of the induction heating cooking apparatus according to Embodiment 5.

As illustrated in FIG. 27, a first induction heating unit 11 includes an inner circumferential coil 111 provided at the center of the first induction heating zone 1, and outer circumferential coils 113a to 113d provided on an outer circumferential side of the inner circumferential coil 111.

The inner circumferential coil 111 includes a first inner circumferential coil 111a and a second inner circumferential coil 111b that are concentrically arranged. The first inner circumferential coil 111a and the second inner circumferential coil 111b are connected in series to each other. The outer circumferential coils 113a to 113d are each formed substantially in the shape of a quarter-circular arc (the shape of a banana or the shape of a cucumber), and are provided outward of the inner circumferential coil 111 and substantially along the outer circumference of the inner circumferential coil 111. A high-frequency current is supplied from the drive circuit 50c to each of the outer circumferential coils 113a to 113d.

In the case where the material of part of the object 5 that is located above the inner circumferential coil 111 is a magnetic body, and a nonmagnetic body is located above the outer circumferential coils 113a to 113d, the controller 45 performs the following operation. The controller 45 sets the frequency of the high-frequency current to be supplied from the drive circuit 50c to the outer circumferential coils 113a to 113d to a frequency higher than the frequency of the high-frequency current to be supplied from the drive circuit 50a to the inner circumferential coil 111.

In the above configuration also, it is possible to perform induction heating suitable for the material of the object 5 when inductively heating the object 5 made of a composite body.

(Modification 2)

Figure 28:
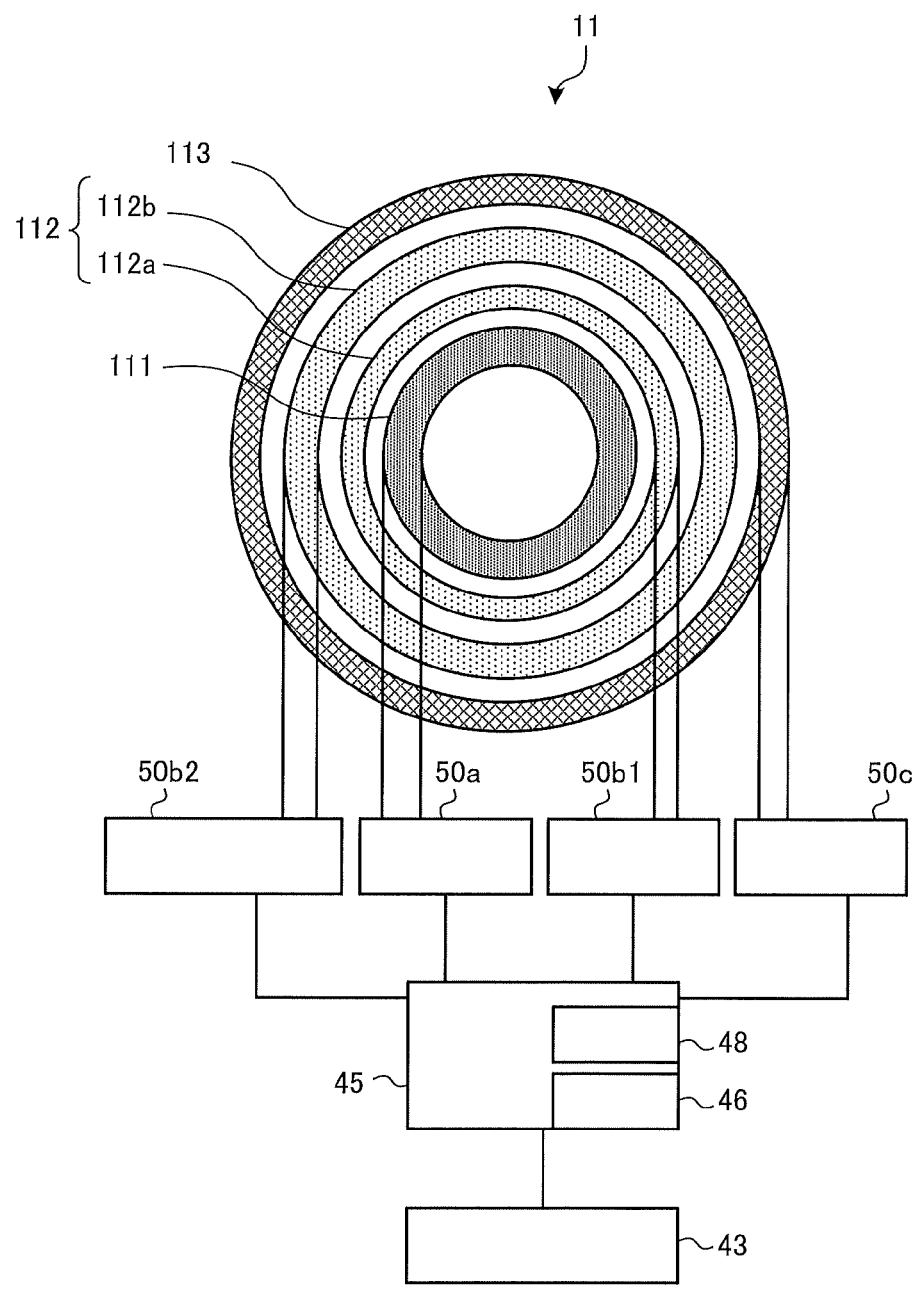
FIG. 28 is a block diagram illustrating a configuration in modification 2 of the induction heating cooking apparatus according to Embodiment 5.

FIG. 28 is a block diagram illustrating a configuration in modification 2 of the induction heating cooking apparatus according to Embodiment 5.

As illustrated in FIG. 28, an intermediate coil 112 includes a first intermediate heating coil 112a and a second intermediate heating coil 112b. The first intermediate heating coil 112a and the second intermediate heating coil 112b have different diameters, and are concentrically arranged. The second intermediate heating coil 112b is provided outward of the first intermediate heating coil 112a. The first intermediate heating coil 112a and the second intermediate heating coil 112b are wound independently of each other.

The first intermediate heating coil 112a is driven and controlled by a drive circuit 50b1. The second intermediate heating coil 112b is driven and controlled by a drive circuit 50b2. The configurations of the drive circuits 50b1 and 50b2 are the same as those of Embodiment 1 described above.

The controller 45 controls the frequency of the high-frequency current to be supplied from the drive circuit 50b1 to the first intermediate heating coil 112a, based on the material of part of the object 5 that is located above the first intermediate heating coil 112a. Also, the controller 45 controls the frequency of the high-frequency current to be supplied from the drive circuit 50b2 to the second intermediate heating coil 112b, based on the material of part of the object 5 that is located above the second intermediate heating coil 112b.

In the case where the material of part of the object 5 that is located above the inner circumferential coil 111 is a magnetic body, and a nonmagnetic body is located above the outer circumferential coil 113, the controller 45 performs the following operation. The controller 45 sets the frequency of the high-frequency current to be supplied from the drive circuit 50c to the outer circumferential coil 113 to a frequency higher than the frequency of the high-frequency current to be supplied from the drive circuit 50a to the inner circumferential coil 111.

In the above configuration also, it is possible to perform induction heating suitable for the material of the object 5 when inductively heating the object 5 made of a composite body.

1 first induction heating zone 2 second induction heating zone 3 third induction heating zone 4 top plate 5 object to be heated 6 magnetic body 11 first induction heating unit 12 second induction heating unit 13 third induction heating unit 21 AC power supply 22 DC power supply circuit 22a diode bridge 22b reactor 22c smoothing capacitor 23 inverter circuit 23a IGBT 23b IGBT 23c diode 23d diode 24a resonant capacitor 25a input current detecting unit 25b coil current detecting unit 40 operation portion 41 display portion 43 operation and display portion 45 controller 46 material determining unit 48 memory 50 drive circuit 50a drive circuit 50b drive circuit 50b1 drive circuit 50b2 drive circuit 50c drive circuit 60 insulator 60a insulator 60b insulator 61 ferrite 61a ferrite 61b ferrite 61c ferrite 61d ferrite supporting base 62a annular portion 63 opening 64 opening 65 notch magnetic shield member 75 magnetic shield member 100 induction heating cooking apparatus 111 inner circumferential coil 111a first inner circumferential coil 111b second inner circumferential coil 112 intermediate coil 112a first intermediate heating coil 112b second intermediate heating coil 113 outer circumferential coil 113a outer circumferential coil 113b outer circumferential coil 113c outer circumferential coil 113d outer circumferential coil

The invention claimed is:

1. An induction heating cooking apparatus comprising:
a plurality of heating coils including an inner circumferential coil provided on an innermost circumferential side, an outer circumferential coil provided on an outermost circumferential side, and an intermediate coil provided between the inner circumferential coil and the outer circumferential coil;
a supporting base provided below the plurality of heating coils, and configured to support the plurality of heating coils;
a plurality of inverter circuits each configured to supply high-frequency power to an associated one of the plurality of heating coils; and
a controller configured to control driving of the plurality of inverter circuits, and perform a heating operation in which a frequency of the high-frequency power to be supplied to the outer circumferential coil is increased higher than a frequency of the high-frequency power to be supplied to the inner circumferential coil, and a frequency of high-frequency current to be supplied to the intermediate coil is increased higher than a frequency of the high-frequency current to be supplied to the inner circumferential coil,
wherein the supporting base is formed in the shape of a flat plate and made of a nonmagnetic body, and includes a plurality of first openings formed in part of the supporting base that is located below the outer circumferential coil, and also a plurality of second openings formed in part of the supporting base that is located below the intermediate coil, and
wherein the first openings of the supporting base are notches extending radially inward from an outer circumferential edge, including a border, of the supporting base.

2. The induction heating cooking apparatus of claim 1, further comprising:
a plurality of ferrites provided between the plurality of heating coils and the supporting base;
wherein a ferrite, of the plurality of ferrites, provided under the outer circumferential coil is located in a larger area than an area in which another ferrite, of the plurality of ferrites, provided under the inner circumferential coil is located, as viewed in plan view.

3. The induction heating cooking apparatus of claim 1, further comprising:
a plurality of ferrites provided between the plurality of heating coils and the supporting base;
wherein a ferrite, of the plurality of ferrites, provided under the outer circumferential coil has a lower magnetic resistance than a magnetic resistance of another ferrite, of the plurality of ferrites, provided under the inner circumferential coil, at the frequency of the high-frequency current to be supplied to the outer circumferential coil.

4. The induction heating cooking apparatus of claim 2, wherein the ferrite, of the plurality of ferrites, provided under the outer circumferential coil is formed with an end portion that is located on an outer circumferential side of the outer circumferential coil, the end portion projecting upwards along a side surface of the outer circumferential coil.

5. The induction heating cooking apparatus of claim 2, wherein the ferrite, of the plurality of ferrites, provided under the outer circumferential coil is formed with an end portion that is located on an inner circumferential side of the outer circumferential coil, the end portion projecting upwards along a side surface of the outer circumferential coil.

6. The induction heating cooking apparatus of claim 2, further comprising
an insulator provided between the plurality of heating coils and the plurality of ferrites.

7. The induction heating cooking apparatus of claim 2, further comprising
an insulator provided between the plurality of ferrites and the supporting base.

8. The induction heating cooking apparatus of claim 1, further comprising
magnetic shield members that are provided below at least some of the first openings and the second openings of the supporting base, the magnetic shield members being made of a flat metal plate.

9. The induction heating cooking apparatus of claim 8, wherein an end portion of each of the magnetic shield members is connected to part of an edge of an associated one of the first openings or the second openings.

10. The induction heating cooking apparatus of claim 9, wherein the magnetic shield members are formed integrally with the supporting base, by forming the at least some of the first openings and the second openings by cutting and raising part of the supporting base.

11. The induction heating cooking apparatus of claim 1, wherein the plurality of heating coils have different diameters and are concentrically arranged.

12. The induction heating cooking apparatus of claim 1, further comprising
a material determining unit configured to determine a material of part of an object to be heated that is located above each of the plurality of heating coils,
wherein when the material of part of the object to be heated that is located above the outer circumferential coil includes at least a nonmagnetic body, and a material of part of the object that is located above the inner circumferential coil is a magnetic body, the controller increases a frequency of high-frequency current to be supplied to the outer circumferential coil to a frequency higher than a frequency of high-frequency current to be supplied to the inner circumferential coil.

13. The induction heating cooking apparatus of claim 1, wherein
the notches are circumferentially spaced apart from each other such that in a plan view, normal to the supporting base, the supporting base resembles a gear with teeth.

14. The induction heating cooking apparatus of claim 1, wherein
in a plan view, normal to the supporting base, the notches are rectangular in shape.

15. The induction heating cooking apparatus of claim 14, wherein
the notches are circumferentially spaced apart from each other such that in the plan view, the supporting base resembles a gear with teeth.

* * * * *